United States Patent
Zhang et al.

(10) Patent No.: US 11,353,859 B2
(45) Date of Patent: Jun. 7, 2022

(54) SYSTEM AND METHOD FOR ANOMALY DETECTION IN TIME-VARYING SYSTEM OPERATIONS

(71) Applicant: Mitsubishi Electric Research Laboratories, Inc., Cambridge, MA (US)

(72) Inventors: Jing Zhang, Weymouth, MA (US); Daniel Nikovski, Brookline, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 247 days.

(21) Appl. No.: 16/358,644

(22) Filed: Mar. 19, 2019

(65) Prior Publication Data

US 2020/0301405 A1 Sep. 24, 2020

(51) Int. Cl.
  *G05B 23/02* (2006.01)
  *G06F 17/16* (2006.01)

(52) U.S. Cl.
  CPC ..... *G05B 23/0221* (2013.01); *G05B 23/0235* (2013.01); *G05B 23/0272* (2013.01); *G06F 17/16* (2013.01)

(58) Field of Classification Search
  CPC ............ G05B 23/0221; G05B 23/0235; G05B 23/0272; G06F 17/16
  See application file for complete search history.

(56) References Cited

U.S. PATENT DOCUMENTS

| | | | |
|---|---|---|---|
| 9,697,177 B1* | 7/2017 | Cairns | H03M 7/3059 |
| 2016/0004963 A1* | 1/2016 | Hasegawa | G06N 3/088 |
| | | | 706/25 |
| 2018/0158314 A1* | 6/2018 | Larsson | G08B 31/00 |
| 2018/0260560 A1* | 9/2018 | Gross | G06F 11/3055 |
| 2019/0227504 A1* | 7/2019 | Ma | G05B 23/0227 |
| 2020/0002127 A1* | 1/2020 | Kusserow | B66B 5/0037 |
| 2020/0257686 A1* | 8/2020 | Law | G06F 16/2477 |

OTHER PUBLICATIONS

Anton, Simon; "Time is of the Essence: Machine Learning-based Intrusion Detection in Industrial Time Series Data", 2018 IEEE International Conference on Data Mining Workshops, pp. 1-6 (Year: 2018).*

* cited by examiner

*Primary Examiner* — Tarun Sinha
*Assistant Examiner* — Yossef Korang-Beheshti
(74) *Attorney, Agent, or Firm* — Gennadiy Vinokur; Hironori Tsukamoto

(57) ABSTRACT

A system for detecting an anomaly in an execution of an operation of a machine determines a local matrix profile (LMP) of a test signal with respect to the baseline signals. LMP is a time series of values, each LMP value for a time instance is determined for a segment of the test signal based on a minimum distance between the segment of the test signal with corresponding segments of the baseline signals, such that each LMP value is a value of a local dissimilarity of the execution of the operation of the machine with respect to the baseline executions of the operation of the machine. The system determines an accumulation of the LMP values above an LMP threshold and detects an anomaly when the accumulation above an anomaly detection threshold.

19 Claims, 17 Drawing Sheets

Table 9.1 The Confusion Matrix of the LMP-based classifier.

| prediction \ ground-truth | 0 | 1 | 2 | 3 | 4 | 5 |
|---|---|---|---|---|---|---|
| 0 | 96 | 96 | 0 | 0 | 0 | 0 |
| 1 | 4 | 4 | 0 | 0 | 0 | 0 |
| 2 | 0 | 0 | 100 | 0 | 0 | 0 |
| 3 | 0 | 0 | 0 | 100 | 0 | 0 |
| 4 | 0 | 0 | 0 | 0 | 100 | 1 |
| 5 | 0 | 0 | 0 | 0 | 0 | 99 |

FIG. 9B

SYSTEM AND METHOD FOR ANOMALY DETECTION IN TIME-VARYING SYSTEM OPERATIONS

TECHNICAL FIELD

The present disclosure relates generally to anomaly detection of equipment failure, and in particular, to anomaly detection in systems with time-varying operations.

BACKGROUND

Modern computer systems collect large amounts of information from various physical systems and/or machines. Maintaining such machines in good working order is an important task associated with their operation, and how and when maintenance is performed has a very significant effect on the economic aspect of their operation. One maintenance strategy is to repair a machine only after it fails (also known as corrective maintenance). This strategy is very often not optimal at all, because repairs of an entire failed machine might be costlier than replacing a single part before the machine breaks, and also machine failure might result in wasted materials, unacceptable product quality, and might even endanger the personnel operating the machine. In situations when corrective maintenance is not a viable or economic option, a different strategy is used—regular maintenance of the machine at fixed intervals, for example one year. Examples of such safety critical machines are elevators and cars; in most parts of the world, their maintenance is done once per year, and corresponding certificates are issued. This strategy is commonly known as preventive maintenance.

Although preventive maintenance addresses the safety issues that are associated with machine maintenance, there are many cases when it is not economically optimal. The first problem with preventive maintenance is that the length of the maintenance cycle is often arbitrary (e.g., one year or one month), and has more to do with the convenience of the inspection authorities and the logistics of the inspection process (e.g. issuing inspection stickers for cars), than with the actual need of the machines. The baseline problem is that a single maintenance cycle could not possibly be optimal for all machines in a group, where some of the machines are new, and might require maintenance not very often, whereas older machines might require maintenance much more often.

In the machine analysis industry, sensors are typically used to measure machine parameters. As the instrumentation of machine operations increases, large amounts of data are being collected from sensors that monitor operations of the machines. The data from some sensors may also be generated at a relatively high frequency, which further results in large amounts of data. The data streams from sensors associated with machines may be analyzed to determine the state of the machine. For example, in some cases, a data stream from a sensor associated with machines may be analyzed to determine whether the machine is not performing as expected, referred to as equipment failure.

A number of system operations can be described as time-varying processes that may or may not include repetitive cycles. It is generally difficult to analyze time-varying processes due to their unpredictability and distribution of the measurements of the time-varying processes that is considered normal. To that end, conventional methods for anomaly detection of time-varying system operations suffer from false positive and/or false negative problems declaring an anomaly for normal variation of a system operation and/or failing to declare an anomaly when needed.

To that end, there is still a need for a system and a method for anomaly detection in time-varying system operations.

SUMMARY

Some embodiments are based on the discovery of a new statistical time series data mining primitive that can represent statistical observations on dynamics of time-varying operations of machines represented by time-varying signals. The time-varying operations of machines may or may not have repetitive cycles. Examples of such time-varying operations include opening and closing of an elevator door, inserting a component during an assembly in a factory automation process, operation of a motor moving a mass according to a trajectory, etc. The time-varying signals representing the time-varying operations are time-series samples of measurements of an operation of a machine collected from one or multiple sensors. In general, it is difficult to perform statistical analysis of time-varying signals due to their volatility and/or unpredictability, and the changing nature of the operating process. To that end, the discovered statistical primitive can facilitate statistical analysis of time-varying signals that can be beneficial for a number of applications.

As used herein, a time-varying signal or a signal is a time series of values. A time series is a sequence of values measured and/or determined sequentially in time. Each value in a time series corresponds to an instance of time that can be defined by a time stamp associated with the value. The values in the time series are arranged sequentially according to their time stamps. An instance of time can be indicated by an absolute time and/or by a relative time, e.g., the time since the start of an operation of machine. Relative time instances are advantageous, because they can facilitate alignment of measurements of different signals representing different executions of the operation of the machine.

In this disclosure, a time-varying signal includes a time series of samples of measurements of physical variables of an operation of the machine. Examples of such physical variables include torque and/or voltages of a motor moving a mass, positions, velocities and/or acceleration of the mass, etc. A time series sample can be single- or multi-dimensional, i.e., one sample can include measurements of different physical quantities of the operation of the machine.

This disclosure refers to the newly discovered statistical time series data mining primitive as a localized matrix profile (LMP). As defined herein, an LMP of a time-varying signal is a time-varying profile of local dissimilarities of the test time-varying signal to other time-varying signal. The time-varying signal for which the LMP is determined is referred to as an input or a test time-varying signal or just a test signal. A time-varying signal used for comparison with the test time-varying signal for the purpose of determining LMP of the test time-varying signal is referred to as a baseline time-varying signal or just a baseline signal.

Specifically, the "time-varying" part of the LMP definition indicates that the LMP is synchronized with the time-varying signal in time. In other words, the test time-varying signal and the LMP of the test time-varying signal are both functions of time, such that a value of the LMP at an instance of time is derived at least in part from a value of the test time-varying signal at the same instance of time. Notably, because the LMP represents dissimilarity of the test time-varying signal to the baseline time-varying signal, the value of the LMP at the instance of time also depends on the value of the baseline time-varying signal at the instance of time. In such a manner, the LMP preserves the time attribute of the test time-varying signal, which is advantageous for a number of time series data mining applications.

In practice, time-varying signals usually correspond to transient processes, where the process undergoes a transition through a sequence of operating modes, and the measured signals for these modes are generally different. An example is the start-up sequence of a motor or a car, where physical measurements of the motor or engine vary with time until settling into a steady operating regime. For the purpose of anomaly detection in such time-varying processes, it is beneficial to associate measurements with the time when these measurements were made. For example, one value of the temperature of a car engine might be normal 10 baselines after start-up, but abnormal 30 minutes into operation.

The "local dissimilarities" part of the definition of the LMP means that a value of the LMP at an instance of time depends on the difference between a local neighborhood of values of the test time-varying signal at the instance of time and a local neighborhood of values of the baseline time-varying signal at the same instance of time, and is independent from other values of the test and the baseline time-varying signals. An example of an LMP value for an instant of time is the Euclidean distance between a segment of the test time-varying signal centered on its value at the instance of time and a segment of the baseline time-varying signal centered on its value at the same instance of time. In other implementations, the segment for an instance of time does not have to be centered on its value at the instance of time. For example, the position of the segment can start, end, include, and otherwise depend on the position of the value at the instance of time. In such a manner, each value of the LMP is indicative of the variation of local dynamics of the test time-varying signal, which is advantageous for a number of time series data mining applications.

In addition, the "profile" part of the LMP definition means that an LMP is a function of time. More specifically, since the test time-varying signal is a time series, the LMP of the test time-varying signal is also a time series. Because each value of the LMP is a statistical variation of local dynamics of the time-varying operation of a machine, an LMP is a time series of statistical variations of local dynamics in the operation of a machine. In such a manner, an LMP of a time-varying signal allows for performing statistical analysis of dynamics of the operation of a machine regardless of "unpredictability" of the time-varying signal.

Specifically, the LMP has a number of properties advantageous for statistical analysis of dynamics of the operation of a machine represented by a time-varying signal. First, due to "unpredictability" of the operation of a machine, the dynamics of the time-varying operation of a machine are time dependent. Notably, the LMP preserves time information, which allows performing time dependent statistical analysis.

Second, the LMP follows the principles of statistics because the LMP of a test time-varying signal is a function independent on the distribution of the values of the test time-varying signal. Indeed, because the LMP is a function of a local difference between the test and the baseline time varying signals, the same value of the LMP can be produced for different values of the test time varying signal and vice versa.

Third, the LMP captures local dynamics of the operation of a machine as well as global dynamics of the operation of a machine. Each value of the LMP is determined from local information, i.e., local dynamics, but the sequence of LMP values still captures statistics on a global variation of dynamics of the operation of a machine. Such a construction allows some embodiments to observe local statistical parameters of time-varying signals over time.

In addition, in some embodiments, the notion of LMP is extended to capturing statistical dissimilarities of a test time-varying signal with respect to multiple baseline time-varying signals. In these embodiments, each value of the LMP of a test time-varying signal is a function of the differences between a segment of the test time-varying signal and the corresponding segments of the baseline time-varying signals. For example, the value of the LMP of a test time-varying signal is the minimum Euclidean distance between a segment of the test time-varying signal and the corresponding segments of the baseline time-varying signals. These embodiments more accurately capture statistical nature of the LMP.

Additionally or alternatively, in some embodiments, an LMP is determined for univariate time series (UTS), which is the case, for example, when a time-varying signal includes measurements of a single sensor or multiple sensors of a single type. Additionally or alternatively, in some embodiments, an LMP is determined for multivariate time series (MTS), which is the case, for example, when a time-varying signal includes measurements of different sensors of different types. For example, the operation of a machine can be represented by measurements of accelerometer, torque sensor, and position sensor. Formally, an MTS item is formed by multiple UTS items, each UTS corresponding to a specific dimension. Notably, the LMP can be determined for MTS internally, i.e., a single value of LMP is determined from corresponding values of multiple time-series data. In such a manner, some embodiments reduce the dimensionality of the time series data as well as computational burden of statistical analysis on the time-varying signal.

For example, in some embodiments, each value of the LMP determined for an MTS item with respect to a set of baseline (normal) MTS items is the minimum of the weighted Euclidean distances between the corresponding segments of UTS contained in the MTS items. The Euclidean distances can be equally weighted, i.e., with the same weights, which simplifies the computation. However, because the UTS time-varying signals of different dimensions of the MTS time-varying signal can be correlated, the equally weighted Euclidean distances can only convey partial information in the resulting LMP. To that end, in some embodiments the weighted Euclidean distances are determined with different weights for different sensors measuring different dimensions of the time-varying signal. For example, in some embodiments, such weights are calculated using unsupervised methods (no labels for the MTS items are needed; e.g., in fault detection/classification applications, it is unknown whether an MTS item is normal or not, and it is also unknown what type of fault a faulty MTS item might have) based on principal component analysis (PCA), which utilizes the properties of the principal components (PCs) and the descriptive common principal components (DCPCs) to preserve the correlation information among variables. The variable importance scores (VISs, i.e., weights) of variables are calculated according to their contribution to the common principal components.

Some embodiments are based on recognition that an LMP can be efficiently computed using a sliding window technique. A length of the window, defines the length of a segment of the test and baseline time-varying signal for determining a value of the LMP, and a position of the window defines a time instance for which the LMP value is determined. The sliding window technique shifts the window one or multiple time instances in time to iteratively determine the values of the LMP. For each iteration, i.e., for each shift of a window, the value of the LMP is a function of a previous value of the LMP, an old shift value of the LMP determined for an old shift of the window that is no longer part of the window, and a new shift value of the LMP determined for the newly added part of the window. The previous value of the LMP and the old shift value of the LMP are available from a previous iteration. Thus, to determine a current value of the LMP during the current iteration, some embodiments need only determine the new shift value of the LMP and combine this value with the previously determined values. For a subsequent iteration, the current value of the LMP becomes the previous value of the LMP and the new shift value of the LMP becomes the old shift value of the LMP. In such a manner, the computational complexity of determining the LMP is reduced compared to a brute force LMP computation.

Some embodiments are based on recognition that an LMP is a statistical primitive that can be used in a variety of applications. For example, it is an object of some embodiments to use the LMP to perform anomaly detection and/or fault classification in time-varying operations of the machine by performing a statistical analysis on the LMPs of the time-varying signals representing the operations.

Some embodiments are based on recognition that a time-varying signal of an operation of a machine can be compared with other normal time-varying signals of the operations of the machine that have been successfully executed. In these embodiments, the baseline signal include measurements of a normal operation of the machine, such that the baseline execution of the operation of the machine is a successful execution of the operation of the machine.

For example, time-varying signals can be collected over time from measuring the performance of repeatedly opening and closing an elevator door. If the operations of opening and closing an elevator door have been considered successful—without anomalies or faults, the measurements of those operations become normal time-varying signals. In theory, when an input time-varying signal under consideration is similar to normal time-varying signals that input time-varying signal can be considered normal. Conversely, when an input time-varying signal under consideration is dissimilar to normal time-varying signals that time-varying signal can be considered anomalous or faulty. To that end, in some embodiments, the baseline time-varying signals are normal time-varying signals of the operations of the machine.

Additionally or alternatively, some embodiments are configured to classify the type of fault in the operation of the machine. To that end, some embodiments compare a test signal with signals representing a specific type of a fault in the operation of the machine.

Some embodiments are based on observations that oftentimes the variations in the time-varying signals are allowed. When the tolerable range (i.e., the threshold) of such variations is not appropriately considered, the aforementioned comparison can lead to false positive and/or false negative problems. The false positive problem refers to finding an anomaly in a signal representing a successful operation. Such a situation is commonly caused by setting the comparison threshold to a too small value. The false negative problem refers to not finding an anomaly in a signal representing an unsuccessful operation. Such a situation is commonly caused by setting the comparison threshold to a too large value. The false positive and false negative problems are generally difficult to solve. To that end, setting the comparison threshold appropriately is crucial.

Some embodiments are based on recognition that appropriate comparison thresholds can be determined from the values of the LMPs of baseline time-varying signals, e.g., of a normal the operations of the machine. Deriving the threshold from different LMPs of baseline time-varying signals captures allowable variation of the time-varying signals to reduce false positive and/or false negative errors.

In some embodiments, the thresholds determination procedure for detecting an anomaly in the operation of the machine is divided into three steps: First, collect a number of normal baseline time-varying signals representing successful operations of a machine; these normal signals are used as the multiple baseline time-varying signals in the definition of the LMP. Second, calculate LMP for each baseline signals with respect to other baseline signals. Note, that the LMP of a test time-varying signal representing operations of the machine is calculated with respect to the baseline time-varying signals. Similarly, to calculate the LMP of a given baseline signal, the LMP of such a give baseline signal is calculated with respect to all other baseline signals excluding the given baseline signal itself. Third, for a given time instance, a value of the LMP threshold at the instance of time is a maximum value of LMPs of the baseline signals at the instance of time. Therefore, the thresholds also form a time series which represents the tolerable variations among the normal time-varying signals in a time-dependent manner. As used herein, such a time series of thresholds is denoted LMPT, where "T" indicates threshold, and "LMP" indicates the thresholds are derived from the LMPs of normal time-varying signals. In effect, such the LMP thresholds vary for different instances of time to account for allowed variation of the time-varying signals and to reduce false positive and negative errors.

In addition, some embodiments are based on realization that the difference time series (DTS) between the LMP of an input time-varying signal with respect to baseline time-varying signals and the corresponding LMPT can help to address the false positive and false negative problems of anomaly detection. For each time instance, the value of such a DTS is equal to the value of the LMP of the input time-varying signal with respect to normal time-varying signals subtracting the value of the corresponding LMPT at the time instance. Each positive (i.e., greater than zero) value of such a DTS represents a local error of the input time-varying signal. However, a sequence of positive values of the DTS represents an accumulation of the error as an indication of a presence of anomaly; while subsequent non-positive values represent a recovery from the error as an indication of an absence of anomaly. Accordingly, the DTS allows to provide a statistical analysis of accumulation and/or recoveries of local errors overtime. Errors accumulations and recoveries better represent the actual situation in various operations than just a single local error at a specific time. Hence, consideration of errors accumulations and recoveries in anomaly detection using DTS addresses the false positive and false negative problems in a computationally efficient manner.

Some embodiments are based on recognition that a value of prohibitive accumulation of local errors is machine dependent and can be selected based on experimentation. However, it is also observed that the prohibitive accumulation can depend not only on the values of the local errors but also on the rate of change of the values of the local errors. To that end, some embodiments determine the accumulation as a function of the DTS values within the period of time and/or a function of derivatives of DTS at the DTS values within the period of time.

To that end, some embodiments disclose indirect anomaly detection based on LMPs rather than raw measurements of operations of the machine. Such indirect anomaly detection is advantageous based at least on the following reasons. First, an LMP is still a time series that preserves time information of different operations of the machine. Second, the LMP is a better representation of dissimilarities than the raw samples and more intuitively indicates the anomalies. Third, the LMP allows considering dynamics of the time-varying operation of the machine at least twice, i.e., test time when the LMP is determined and baseline time when the segments of LMP are analyzed.

Moreover, the determination and comparisons of the time series of dissimilarity values can be conducted on different time scales, e.g., the length of the segments for determining the time series of dissimilarity values can differ from the length of the segments for comparing different time series of dissimilarity values for anomaly detection. These different time scales allow to better consider local deviations of the time-varying process adapted to a global anomaly detection procedure. In addition, different time series of dissimilarity values determined from normal historical samples represent a normal deviation of the time-varying process as a function of time, which allow to better determine an anomaly detection threshold for the time-varying process.

Accordingly, one embodiment discloses a system for detecting an anomaly in an execution of an operation of a machine, that includes an input interface configured to input a test signal including a time series of measurements of an operation of the machine; a memory configured to store a set of baseline signals, each baseline signal includes a time series of measurements of a baseline execution of the operation of the machine; a hardware processor configured to determine a local matrix profile (LMP) of the test signal with respect to the baseline signals, wherein the LMP is a time series of LMP values, each LMP value for a time instance is determined for a segment of the test signal at the time instance based on a minimum distance between the segment of the test signal with corresponding segments of the baseline signals at the time instance, such that each LMP value is a value of a local dissimilarity of the execution of the operation of the machine with respect to the baseline executions of the operation of the machine; determine an accumulation of the LMP values above an LMP threshold for a period of time; and detect an anomaly when the accumulation of the LMP values above the LMP threshold for the period of time is greater than an anomaly detection threshold to produce a result of anomaly detection; and an output interface configured to output the result of the anomaly detection.

Another embodiment discloses a method for detecting an anomaly in an execution of an operation of a machine, wherein the method uses a processor coupled with stored instructions implementing the method, wherein the instructions, when executed by the processor carry out steps of the method, that includes accepting a test signal including a time series of measurements of an operation of the machine; determining a local matrix profile (LMP) of the test signal with respect to a set of baseline signals, each baseline signal includes a time series of measurements of a baseline execution of the operation of the machine, wherein the LMP is a time series of LMP values, each LMP value for a time instance is determined for a segment of the test signal at the time instance based on a minimum distance between the segment of the test signal with corresponding segments of the baseline signals at the time instance, such that each LMP value is a value of a local dissimilarity of the execution of the operation of the machine with respect to the baseline executions of the operation of the machine; determining an accumulation of the LMP values above an LMP threshold for a period of time; and detecting an anomaly when the accumulation of the LMP values above the LMP threshold for the period of time is greater than an anomaly detection threshold to produce a result of anomaly detection; and outputting the result of the anomaly detection.

Yet another embodiment discloses a non-transitory computer readable storage medium embodied thereon a program executable by a processor for performing a method, the method includes accepting a test signal including a time series of measurements of an operation of the machine; determining a local matrix profile (LMP) of the test signal with respect to a set of baseline signals, each baseline signal includes a time series of measurements of a baseline execution of the operation of the machine, wherein the LMP is a time series of LMP values, each LMP value for a time instance is determined for a segment of the test signal at the time instance based on a minimum distance between the segment of the test signal with corresponding segments of the baseline signals at the time instance, such that each LMP value is a value of a local dissimilarity of the execution of the operation of the machine with respect to the baseline executions of the operation of the machine; determining an accumulation of the LMP values above an LMP threshold for a period of time; and detecting an anomaly when the accumulation of the LMP values above the LMP threshold for the period of time is greater than an anomaly detection threshold to produce a result of anomaly detection; and outputting the result of the anomaly detection.

BRIEF DESCRIPTION OF THE DRAWINGS

FIG. 9B shows confusion matrix summarizing fault classifications for an exemplar embodiment of FIG. 9A.

DETAILED DESCRIPTION

System Overview

Figure 1A:
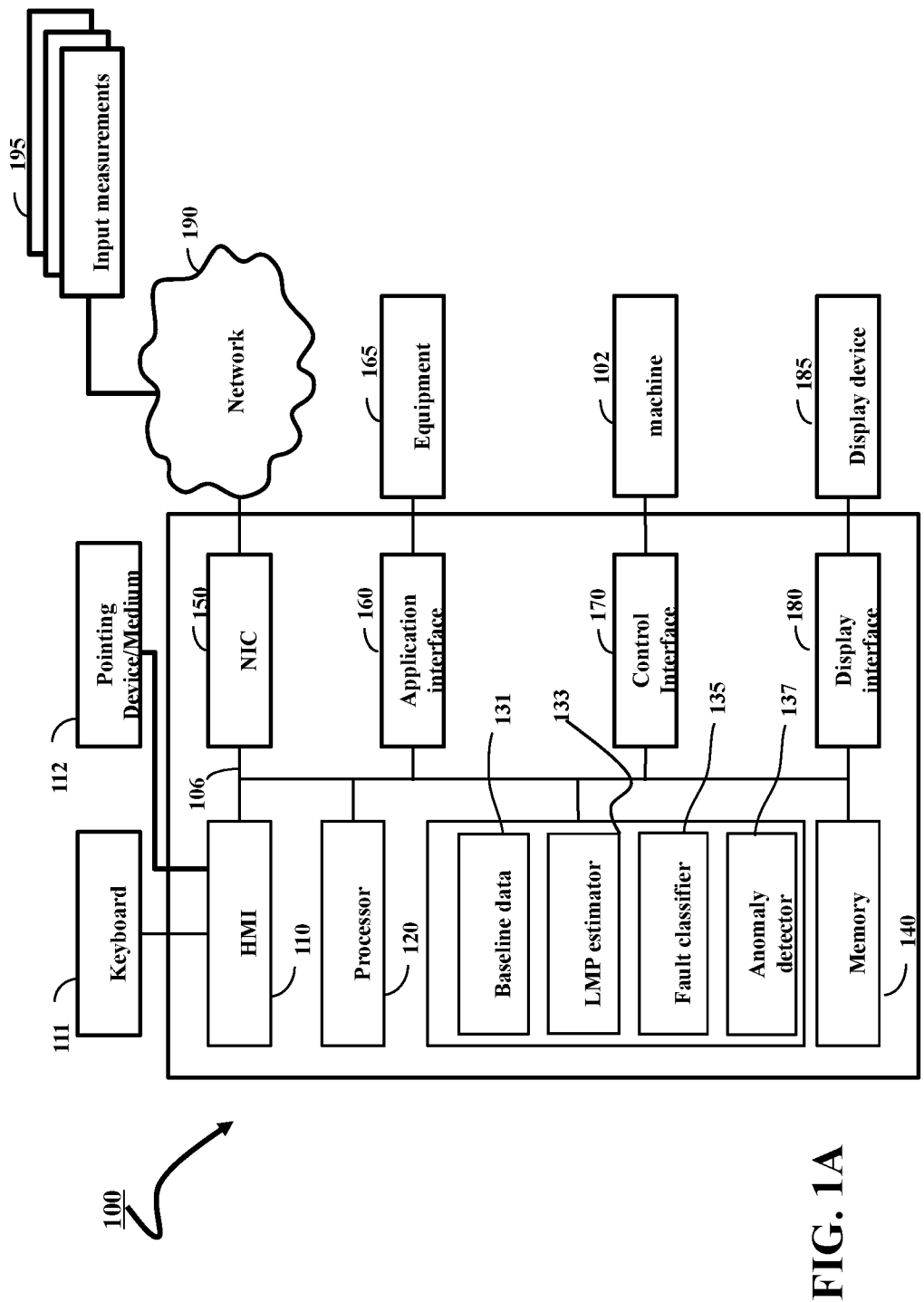
FIG. 1A and FIG. 1B show block diagrams of a system for detecting and/or classifying an anomaly in an operation of a machine according to some embodiments.
Figure 1B:
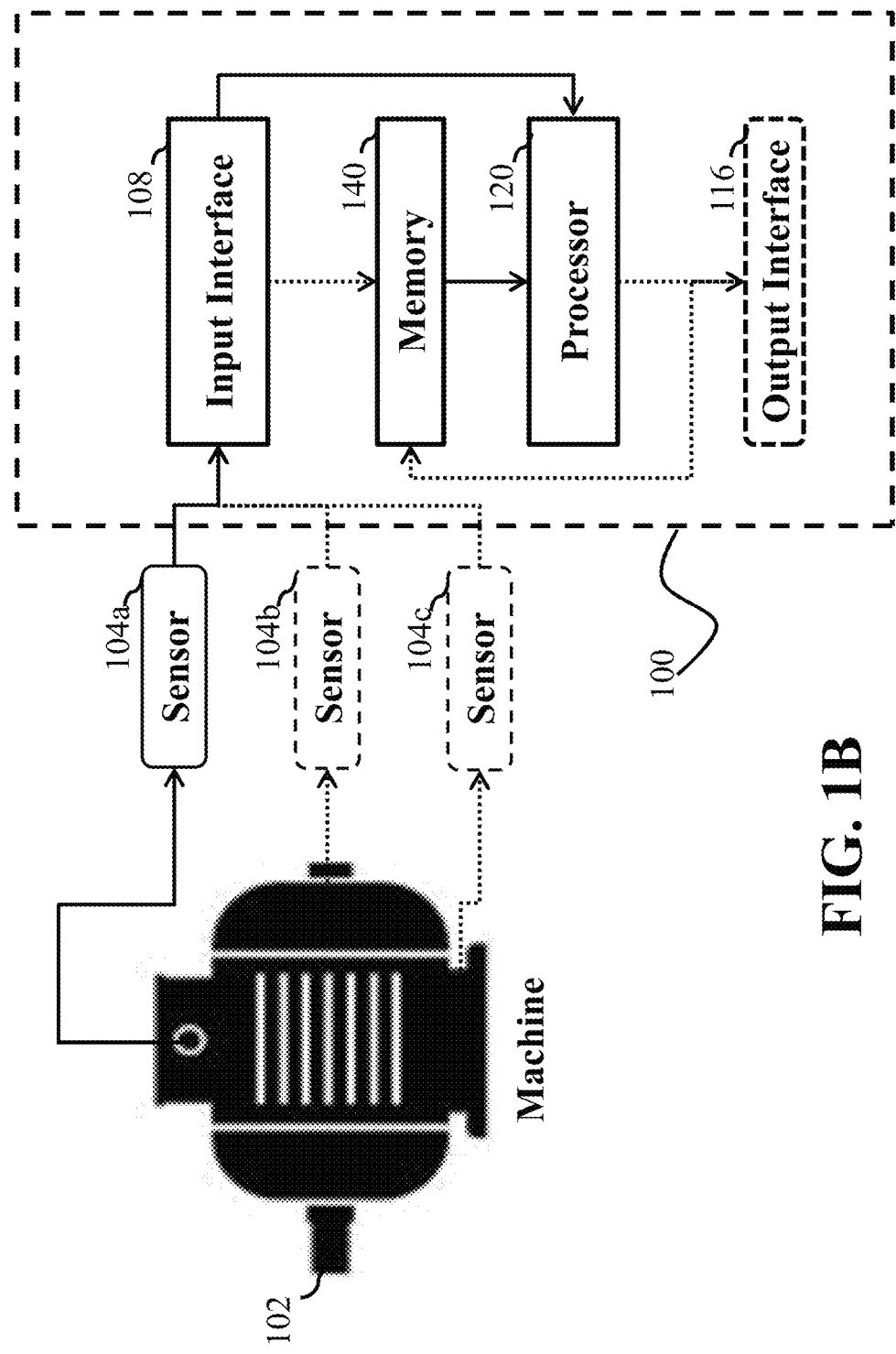

FIG. 1A and FIG. 1B show block diagrams of a system 100 for detecting and/or classifying an anomaly in an operation of a machine 102 according to some embodiments. Examples of the machine 102 include an elevator door system, a robotic assembly, and a servo motor. Examples of the operations of machine include opening/closing elevators door, operating a robotic arm according to a specific task, moving a mass by a servo motor according to a specific trajectory. The system 100 includes one or combination of learning and control components. The learning components are configured to estimate statistical primitives of the operation of the machine. The control components are configured to use the learned statistical primitives to estimate the anomalous values of the operation. In some embodiments, the anomaly detection of the system 100 determines presence or absence of faults in the operation of the machine 102. Additionally or alternatively, in some embodiments, the anomaly detection of the system 100 classifies the type of the fault in the operation of the machine 102.

The system 100 can have a number of input 108 and output 116 interfaces connecting the system 100 with other systems and devices. For example, a network interface controller 150 is adapted to connect the system 100 through the bus 106 to a network 190. Through the network 190, either wirelessly or through the wires, the system 100 can receive a test signal 195 including a time series samples of measurements of an operation of the machine. The measurements of the input signal 195 are measurements from one or combination of sensors 104a, 104b, and 104c or data derived from the measurements of physical variables of an operation of the machine. Examples of such physical variables include torque and/or voltages of a motor moving a mass, positions, velocities and/or acceleration of the mass, etc. A time series sample can be single- or multi-dimensional, i.e., one sample can include measurements of different physical quantities of the operation of the machine.

In some implementations, a human machine interface 110 within the system 100 connects the system to a keyboard 111 and pointing device 112, wherein the pointing device 112 can include a mouse, trackball, touchpad, joy stick, pointing stick, stylus, or touchscreen, among others. Through the interface 110 or NIC 150, the system 100 can receive baseline data, such as values of baseline signals, anomaly detection threshold and/or fault classification thresholds.

The system 100 includes an output interface 116 configured to output the results of the anomaly detection. For example, the output interface can include a memory to render the results of anomaly detection. For example, the system 100 can be linked through the bus 106 to a display interface 180 adapted to connect the system 100 to a display device 185, such as a computer monitor, camera, television, projector, or mobile device, among others. The system 100 can also be connected to an application interface 160 adapted to connect the system to equipment 165 for performing various operations. The system 100 can also be connected to a control interface 170 adapted to connect the system to the machine 102. For example, in some embodiments, the system 100 is configured to control the machine 102 in response to detecting the anomaly of its operation. For example, the system 100 can stop the execution of the operation of the machine 102.

The system 100 includes a processor 120 configured to execute stored instructions, as well as a memory 140 that stores instructions that are executable by the processor. The processor 120 can be a single core processor, a multi-core processor, a computing cluster, or any number of other configurations. The memory 140 can include random access memory (RAM), read only memory (ROM), flash memory, or any other suitable memory systems. The processor 120 is connected through the bus 106 to one or more input and output devices. These instructions implement a method for detecting and/or classifying an anomaly in an operation of a machine.

To that end, the control system 100 includes LMP estimator 133 configured to determine a local matrix profile (LMP) of the input signal with respect to the baseline signals. The baseline signals can be stored in the memory 140 as part of baseline data 131 and/or downloaded through input interfaces 108 of system 100. The LMP is a new statistical time series data mining primitive that can represent statistical observations on dynamics of time-varying operations of machines represented by time-varying signals. The time-varying operations of machines may or may not have repetitive cycles. In general, it is difficult to perform statistical analysis of time-varying signals due to their volatility and/or unpredictability, and the changing nature of the operating process. To that end, the discovered statistical primitive can facilitate statistical analysis of time-varying signals that can be beneficial for a number of applications.

In some embodiments, the baseline signals are normal signals that represent successful execution of operation of the machine under consideration. In these embodiments, the LMP determined with respect to the normal signals can be used to detect anomaly in the operation of the machine. To that end, the system 100 includes an anomaly detector 137 configured to detect an anomaly when an accumulation of the local errors over a period of time as indicated by the LMP is greater than an anomaly detection threshold.

Additionally or alternatively, in some embodiments, the baseline signals are normal signals that represent successful execution of operation of the machine under consideration. In these embodiments, the LMP determined with respect to the normal signals can be used to classify the fault in the operation of the machine. To that end, the system 100 includes a fault classifier 135 configured to classify the fault based on comparison of LMP of the test signal with LMPs of the labeled training signals.

In effect, using LMP as a statistical primitive for comparing different signals and detecting faults when an accumulation of the local errors over a period of time as indicated by the LMP is above a corresponding threshold allows to reduce positive and negative detection errors in anomaly detection and/or fault classification.

Local Matrix Profile (LMP)

Figure 2A:
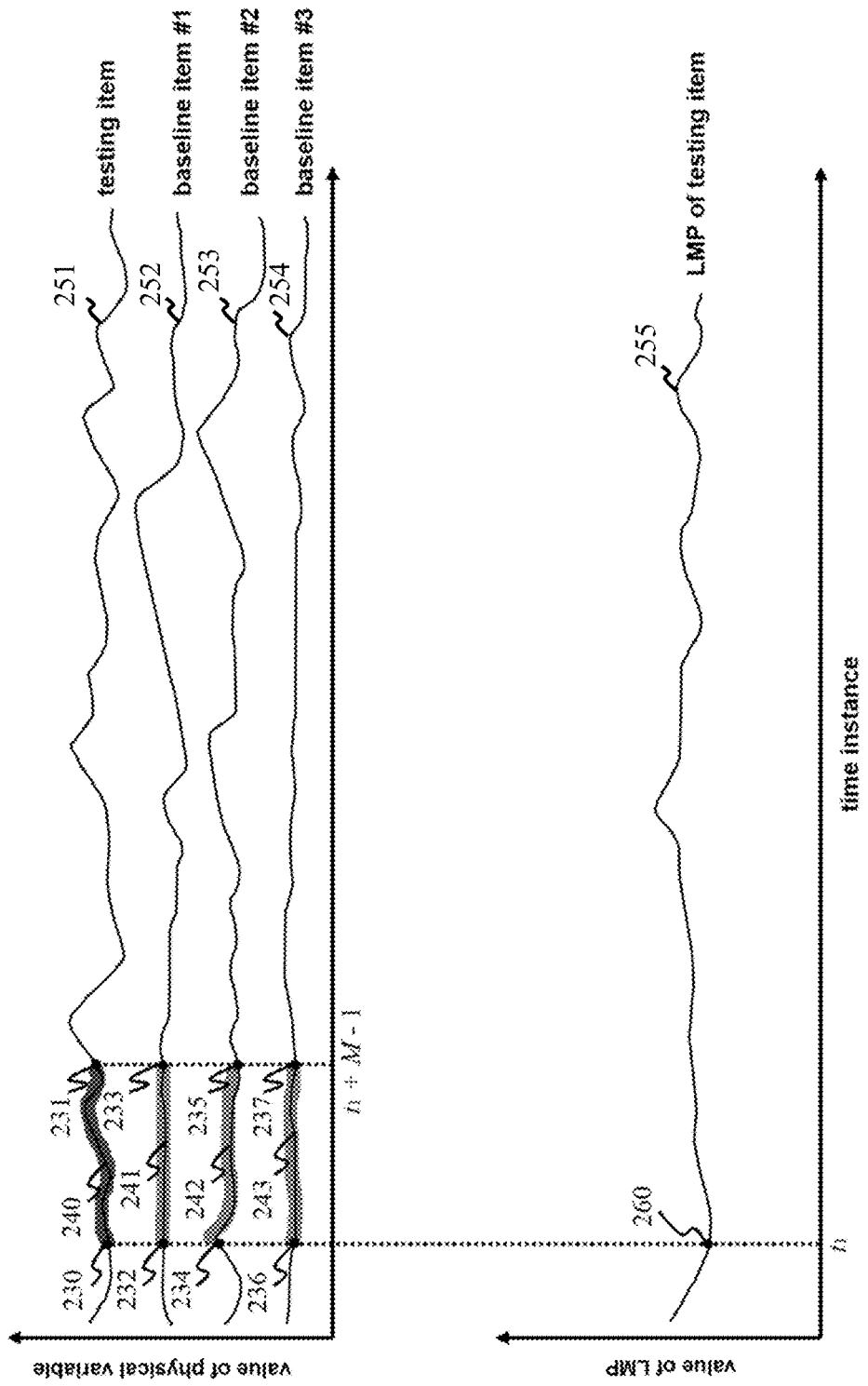
FIG. 2A shows a schematic illustrating a notion of LMP according to some embodiments.

FIG. 2A shows a schematic illustrating a notion of LMP according to some embodiments. Without loss of generality, FIG. 2A shows univariate time series examples. The top subfigure shows a test signal 251 including a time series sample of measurements of an operation of the machine and a set of baseline signals 252, 253, and 254. Each signal corresponds to an execution of the same operation of the machine. The signals are time series signals synchronized in time. The signals corresponding to a single execution of the same operation are also referred herein as items.

For a query length M and for any time instance $t_1$, the value of LMP 260 of the testing item 251 with respect to the set of baseline items 252, 253, and 254 is determined as the minimum Euclidean distance 260 between the subsequence 240 (i.e., the curve segment between points 230 and 231 of 251) and the subsequences 241 (i.e., the curve segment between points 232 and 233 of 252), 242 (i.e., the curve segment between points 234 and 235 of 253), and 243 (i.e., the curve segment between points 236 and 237 of 254). Note that the subsequences 240, 241, 242, and 243 have the same length M and the same starting time $t_1$. The bottom subfigure of FIG. 2A also shows that the values of LMP of the test item with respect to the baseline items are time-varying, forming an accompanying univariate time series 255.

Hence, the LMP is a time series of LMP values, each LMP value for a time instance is determined for a segment of the input signal at the time instance based on dissimilarity of the segment of the input signal with corresponding segments of the baseline signals at the time instance, such that each LMP value is a value of a local error of the operation of the machine for the time instance.

As used herein, a time-varying signal or a signal is a time series of values. A time series is a sequence of values measured and/or determined sequentially in time. Each value in a time series corresponds to an instance of time that can be defined by a time stamp associated with the value. The values in the time series are arranged sequentially according to their time stamps. An instance of time can be indicated by an absolute time and/or by a relative time, e.g., the time since the start of an operation of machine. Relative time instances are advantageous, because they can facilitate alignment of measurements of different signals representing different executions of the operation of the machine.

As defined herein, an LMP of a time-varying signal is a time-varying profile 255 of local dissimilarities 260 of the time-varying signal to another time-varying signal. The time-varying signal for which the LMP is determined is referred to as a test time-varying signal. The other time-varying signal used for comparison with the test time-varying signal is referred to as a baseline time-varying signal.

Specifically, the "time-varying" part of the LMP definition indicates that the LMP is synchronized with the time-varying signal in time. In other words, the test time-varying signal and the LMP of the test time-varying signal are both functions of time, such that a value of the LMP at an instance of time is derived at least in part from a value of the test time-varying signal at the same instance of time. Notably, because the LMP represents dissimilarity of the test time-varying signal to the baseline time-varying signal, the value of the LMP at the instance of time also depends on the value of the baseline time-varying signal at the instance of time. In such a manner, the LMP preserves the time attribute of the test time-varying signal, which is advantageous for a number of time series data mining applications.

The "local dissimilarities" part of the definition of the LMP means that a value of the LMP at an instance of time depends on the difference between a local neighborhood of values of the test time-varying signal at the instance of time and a local neighborhood of values of the baseline time-varying signal at the same instance of time, and is independent from other values of the test and the baseline time-varying signals. An example of an LMP value for an instant of time is the Euclidean distance between a segment of the test time-varying signal centered on its value at the instance of time and a segment of the baseline time-varying signal centered on its value at the same instance of time. In other implementations, the segment for an instance of time does not have to be centered on its value at the instance of time. For example, the position of the segment can start, end, include, and otherwise depend on the position of the value at the instance of time. In such a manner, each value of the LMP is indicative of the variation of local dynamics of the test time-varying signal, which is advantageous for a number of time series data mining applications. For example, as shown in FIG. 2A, the LMP value 260 is formed based on comparison of segments 240, 241, 242, and 243 starting at the time instance of the value 260.

In addition, the "profile" part of the LMP definition means that an LMP is a function of time. More specifically, since the test time-varying signal is a time series, the LMP of the test time-varying signal is also a time series. Because each value of the LMP is a statistical variation of local dynamics of the time-varying operation of a machine, an LMP is a time series of statistical variations of local dynamics in the operation of a machine. In such a manner, an LMP of a time-varying signal allows for performing statistical analysis of dynamics of the operation of a machine regardless of "unpredictability" of the time-varying signal.

Specifically, the LMP has a number of properties advantageous for statistical analysis of dynamics of the operation of a machine represented by a time-varying signal. First, due to "unpredictability" of the operation of a machine, the dynamics of the time-varying operation of a machine are time dependent. Notably, the LMP preserves time information, which allows performing time dependent statistical analysis.

Second, the LMP follows the principles of statistics because the LMP of a test time-varying signal is a function independent on the distribution of the values of the test time-varying signal. Indeed, because the LMP is a function of a local difference between the test and the baseline time varying signals, the same value of the LMP can be produced for different values of the test time varying signal and vice versa.

Third, the LMP captures local dynamics of the operation of a machine as well as global dynamics of the operation of a machine. Each value of the LMP is determined from local information, i.e., local dynamics, but the sequence of LMP values still captures statistics on a global variation of dynamics of the operation of a machine. Such a construction allows some embodiments to observe local statistical parameters of time-varying signal over time.

Definition of Localized Matrix Profile

In some embodiments, an LMP is determined for univariate time series (UTS), which is the case, for example, when a time-varying signal includes measurements of a single sensor or multiple sensors of a single type. Additionally or alternatively, in some embodiments, an LMP is determined for multivariate time series (MTS), which is the case, for example, when a time-varying signal includes measurements of different sensors of different types. For example, the operation of a machine can be represented by measurements of accelerometer, torque sensor, and position sensor. Formally, an MTS includes multiple UTS items, each UTS corresponding to a specific dimension. Note that the UTS is actually a special case of MTS, and therefore this disclosure uses MTS to denote time series gathered from one or multiple sensors.

For convenience of describing the definition of LMP, this disclosure introduces some notation. Let N be the number of variables in the MTS data (i.e., number of sensors for collecting MTS data); it is assumed to be the same for all MTS items, each MTS item corresponding to a run of the same operation of a machine or the same type of machines (e.g., the opening and/or closing of doors of an elevator or the same type of elevators). Denote by n the variable (sensor) index, where n=1, ..., N. Let T be the number of time instances recorded by sensors, which is also assumed to be the same for all MTS items. Denote by t the time instance index, where t=1, ..., T. Let L be the number of baseline MTS items, l the MTS item index, and denote by $a^{(l)} = (a_n^{(l)}(t))$; [n=1, ..., N; t=1, ..., T], l=1, ..., L, the baseline MTS items, where $a_n^{(l)}(t)$ is the value of the n-th variable (sensor) sampled at the t-th time instance in the l-th MTS item. Let $b=(b_n(t))$; [n=1, ..., N; t=1, ..., T] be an MTS item under investigation. Let M be a parameter denoting the subsequence length. The $\zeta$-th subsequence of $a^{(l)}$ with length M is $\theta_a(l)_{,\zeta} = (a_n^{(l)}(t))$; [n=1, ..., N; t=$\zeta$, ..., $\zeta$+M−1], where $\zeta$=1, ..., T−M+1. The $\xi$-th subsequence of b with length M is $\theta_{b,\xi} = (b_n(t))$; [n=1, ..., N; t=$\xi$, ..., $\xi$+M−1], where $\xi$=1, ..., T−M+1. Let the VIS vector be $s=(s_n)$; [n=1, ..., N], where $s_n \geq 0$ is the importance score of the n-th variable (sensor).

Note that, in the above definition, the query length M is selected. This can be done by selecting a dominant frequency of the operation of the machine, or by solving an optimization problem minimizing a loss function in fault detection in a set of baseline items determined by analyzing the LMPs of the baseline items, wherein a set of values of M are optimization parameters of the optimization problem.

Hereafter, some embodiments use $\langle b, \{a^{(l)}; l=1, ..., L\}\rangle_{LMP}$ to denote the Localized Matrix Profile of any given baseline item b $\{a^{(l)}; l=1, ..., L\}$. Note that, in the special case where b$\in\{a^{(l)}; l=1, ..., L\}$, the embodiments take $\langle b, \{a^{(l)}; l=1, ..., L\}\setminus\{b\}\rangle_{LMP}$ as the LMP of b joining $\{a^{(l)}; l=1, ..., L\}$ (otherwise, the LMP would degenerate to a zero vector).

Computation of LMP

Different embodiments use different methods to compute LMP of a test signal with respect to baseline signals and/or to compute LMPs of different baseline signals. For example, one embodiment use the definition of LMP and direct searching in a brute-force algorithm (see Algorithm 2) to obtain the LMP vector g, whose time complexity is O (MNLT) and space complexity is O (NLT). This disclosure uses "FLT_MAX" to denote a large enough number and, in Line 4 of Algorithm 2, the distance $d(\theta_{b,\xi}, \theta_a(l)_{,\xi})$ is calculated directly by definition; refer to (2).

---

Algorithm 2 Brute Force Time Series Localized Matrix Profile (BFTLMP)

Input: MTS item b with length T; L baseline MTS items $a^{(l)}$, l = 1, ..., L, each with length T; VIS vector s; query length M
1:   for $\xi$ = 1, ..., T − M + 1 do
2:      $g_\xi \leftarrow$ FLT_MAX
3:      for l = 1, ..., L do
4:         $g_\xi \leftarrow$ min $\{g_\xi, d(\theta_{b,\xi}, \theta_{a(l),\xi})\}$
5:      end for
6:   end for
Output: g = ($g_\xi$; $\xi$ = 1, ..., T − M + 1)

---

According to the definition of terms with regard to the present disclosure, the Localized Matrix Profile (LMP) of MTS item b joining (i.e., with respect to) the baseline signals set $\{a^{(l)}; l=1, ..., L\}$ is a vector $g=(g_1, ..., g_{T-M+1})$ determined by $$g_\xi = \min_{l \in \{1,...,L\}} d(\theta_{b,\xi}, \theta_{a(l),\xi}), \xi = 1, ..., T - M + 1. \quad (1)$$

In other words, the $\xi$-th entry of the LMP of b joining $\{a^{(l)}; l=1, ..., L\}$ is the WED between the $\xi$-th subsequence of b and its nearest neighbor over all subsequences of $\{a^{(l)}; l=1, ..., L\}$ with the same starting time (i.e., the $\xi$-th time instance).

As used herein The Weighted Euclidean Distance (WED) $d(\cdot, \cdot)$ between subsequences $\theta_a(l)_{,\zeta}$ and $\theta_{b,\xi}$ is defined as $$d(\theta_{b,\xi}, \theta_{a(l),\zeta}) = \sum_{n=1}^{N} s_n \times \sqrt{\sum_{\tau=0}^{M-1} (b_n(\xi+\tau) - a_n^{(l)}(\zeta+\tau))^2}. \quad (2)$$

On the other hand, given l and $\xi$, by (1), then $d(\theta_{b,\xi}, \theta_a(l), \xi) = \sum_{n=1}^{N} s_n \times \sqrt{\Delta_\xi^{(n,l)}}$, where $$\Delta_\xi^{(n,l)} \sum_{\tau=0}^{M-1} (b_n(\xi+\tau) - a_n^{(l)}(\xi+\tau))^2$$

satisfies the following recursion:

$$\Delta_{\xi+1}^{(n,l)} = \Delta_\xi^{(n,l)} + (b_n(\xi+M) - a_n^{(l)}(\xi+M))^2 - (b_n(\xi) - a_n^{(l)}(\xi))^2. \quad (3)$$

From (3), it is seen that after computing $\Delta_\xi^{(n,l)}$, $\Delta_{\xi+1}^{(n,l)}$ can be obtained in O(1) time. The idea makes use of the overlap between consecutive subsequences, and leads to Algorithm 3, which has an O(NLT) time complexity, speeding up the computation by a factor M (the query length; this reduction of time complexity is significant especially when M is large) compared to the brute force alternative.

Algorithm 3 Scalable Time Series Ordered Localized Matrix Profile (STOLMP)

Input: MTS item b with length T; L baseline MTS items $a^{(l)}$, $l = 1, \ldots, L$, each with length T; VIS vector s; query length M
1:  for $l = 1, \ldots, L$ do
2:     for $n = 1, \ldots, N$ do
3:        for $t = 1, \ldots, T$ do
4:           $h_n^{(l)}(t) \leftarrow (b_n(t) - a_n^{(l)}(t))^2$
5:           $h_n^{(l)}(t) \leftarrow h_n^{(l)}(t) + h_n^{(l)}(t-1)$  ▷ $h_n^{(l)}(0) \triangleq 0$
6:        end for
7:     end for
8:  end for
9:  for $\xi = 1, \ldots, T - M + 1$ do
10:    $g_\xi \leftarrow \text{FLT\_MAX}$
11:    for $l = 1, \ldots, L$ do
12:       $d \leftarrow \sum_{n=1}^{N} s_n \times \sqrt{h_n^{(l)}(\xi+M-1) - h_n^{(l)}(\xi-1)}$
13:       $g_\xi \leftarrow \min(g_\xi, d)$
14:    end for
15: end for
Output: $g = (g_\xi; \xi = 1, \ldots, T - M + 1)$ To better facilitate parallelism, some embodiments, in Algorithm 3, do not directly use the recursion (3), but compute all the prefix sums as an initial scan (see Line 5 of Algorithm 3, where $h_n^{(l)}(0)=0$, $\forall n \in \{1, \ldots, N\}, l \in \{1, \ldots, L\}$), and then extract the partial sums involved in the distance computation by an easy subtraction (see Line 12 of Algorithm 3). Note that $h_n^{(l)}(t)$; [n=1, ..., N; t=1, ..., T],l=1, ..., L, are temporary variables saving intermediate results.

Some embodiments are based on recognition that an LMP can be more efficiently computed using a sliding window technique. A length of the window, defines the length of a segment of the test and baseline time-varying signal for determining a value of the LMP, and a position of the window defines a time instance for which the LMP value is determined. The sliding window technique shifts the window one or multiple time instances in time to iteratively determine the values of the LMP. For each iteration, i.e., for each shift of a window, the value of the LMP is a function of a previous value of the LMP, an old shift value of the LMP determined for an old shift of the window that is no longer part of the window, and a new shift value of the LMP determined for the newly added part of the window. The previous value of the LMP and the old shift value of the LMP are available from a previous iteration. Thus, to determine a current value of the LMP during the current iteration, some embodiments need only determine the new shift value of the LMP and combine this value with the previously determined values. For a subsequent iteration, the current value of the LMP becomes the previous value of the LMP and the new shift value of the LMP becomes the old shift value of the LMP. In such a manner, the computational complexity of determining the LMP is reduced compared to a brute force LMP computation.

Figure 2B:
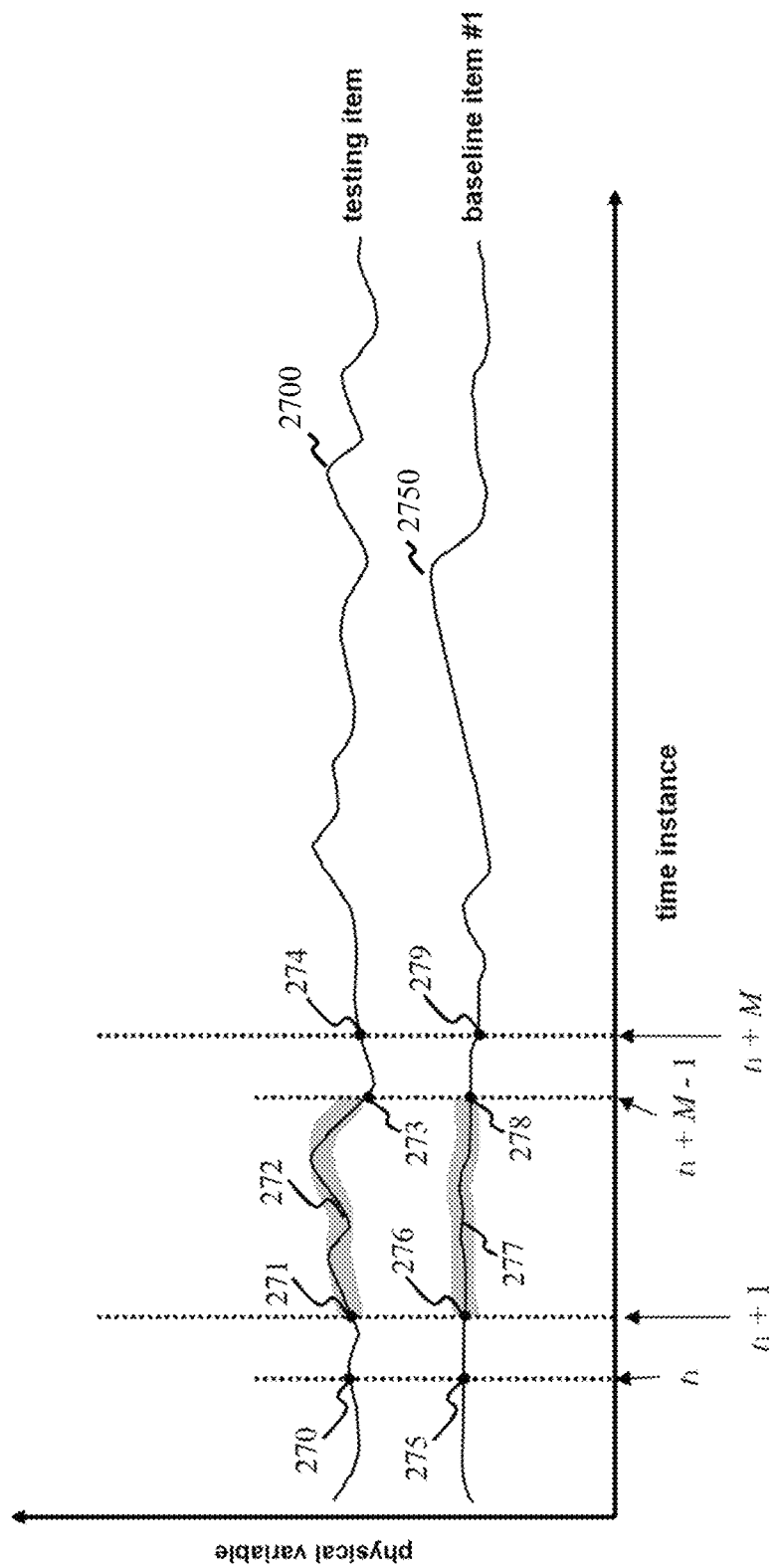
FIG. 2B shows a schematic of a shifting window method for determining LMPs according to some embodiments.

FIG. 2B shows a schematic of a shifting window method for determining LMPs according to some embodiments. The shifting window method exemplifies how to efficiently compute the Euclidean distances between subsequences of a testing univariate time series 2700 and a baseline univariate time series 2750, which is a core subroutine in a fast LMP computation algorithm, according to the present disclosure. Consider two consecutive subsequences of 2700 and 2750, one between time instances $t_1$ and $t_1+M-1$ (i.e., the curve between points 270 and 273 of 2700, and the curve between points 275 and 278 of 2750), and the other between time instances $t_1+1$ and $t_1+M$ (i.e., the curve between points 271 and 274 of 2700, and the curve between points 276 and 279 of 2750). Note that there is an overlap between the corresponding consecutive subsequences; see the curves in orange. The distance between the two overlapped curves can be reused given that it is computed, as a partial sum of distances between (M-1) pairs of scalars, for obtaining the Euclidean distance between the subsequences starting at $t_1$. In particular, when computing the Euclidean distance between the subsequences starting at $t_1+1$, some embodiments directly use this partial sum and only need to calculate the distance between one pair of scalars, which can be done in a constant time independent of the query length M.

LMP Thresholds

Some embodiments are based on recognition that a time-varying signal of an operation of a machine can be compared with other normal time-varying signals of the operations of the machine that have been successfully executed. For example, time-varying signals can be collected over time from measuring the performance of repeatedly opening and closing an elevator door. If the operations of opening and closing an elevator door have been considered successful—without anomalies or faults, the measurements of those operations become normal time-varying signals. In theory, when an input time-varying signal under consideration is similar to normal time-varying signals that input time-varying signal can be considered normal. Conversely, when an input time-varying signal under consideration is dissimilar to normal time-varying signals that time-varying signal can be considered anomalous or faulty.

Some embodiments are based on observations that oftentimes the variations in the time-varying signals are allowed. When the tolerable range (i.e., the threshold) of such variations is not appropriately considered, the aforementioned comparison can lead to false positive and/or false negative problems. The false positive problem refers to finding an anomaly in a signal representing a successful operation. Such a situation is commonly caused by setting the comparison threshold to a too small value. The false negative problem refers to not finding an anomaly in a signal representing an unsuccessful operation. Such a situation is commonly caused by setting the comparison threshold to a too large value. The false positive and false negative problems are generally difficult to solve. To that end, setting the comparison threshold appropriately is crucial.

Some embodiments are based on recognition that appropriate comparison thresholds can be determined from the values of the LMPs of normal time-varying signals of the operations of the machine. Specifically, the thresholds determination procedure is divided into three steps: First, collect a number of normal time-varying signals representing successful operations of a machine; these normal signals are used as the multiple baseline time-varying signals in the definition of the LMP. Baseline, the LMP of a given input time-varying signal representing operations of the machine is calculated with respect to the normal time-varying signals above; however, if the given input time-varying signal is one of these normal time-varying signals, the LMP of such an input time-varying signal is calculated with respect to the normal time-varying signals excluding the input time-varying signal itself. Third, for a given time instance, the threshold for comparison between the LMP of a given input time-varying signal and the LMPs of the normal time-varying signals is determined by taking the maximum of the values of the LMPs of the normal time-varying signals at the time instance.

Figure 2C:
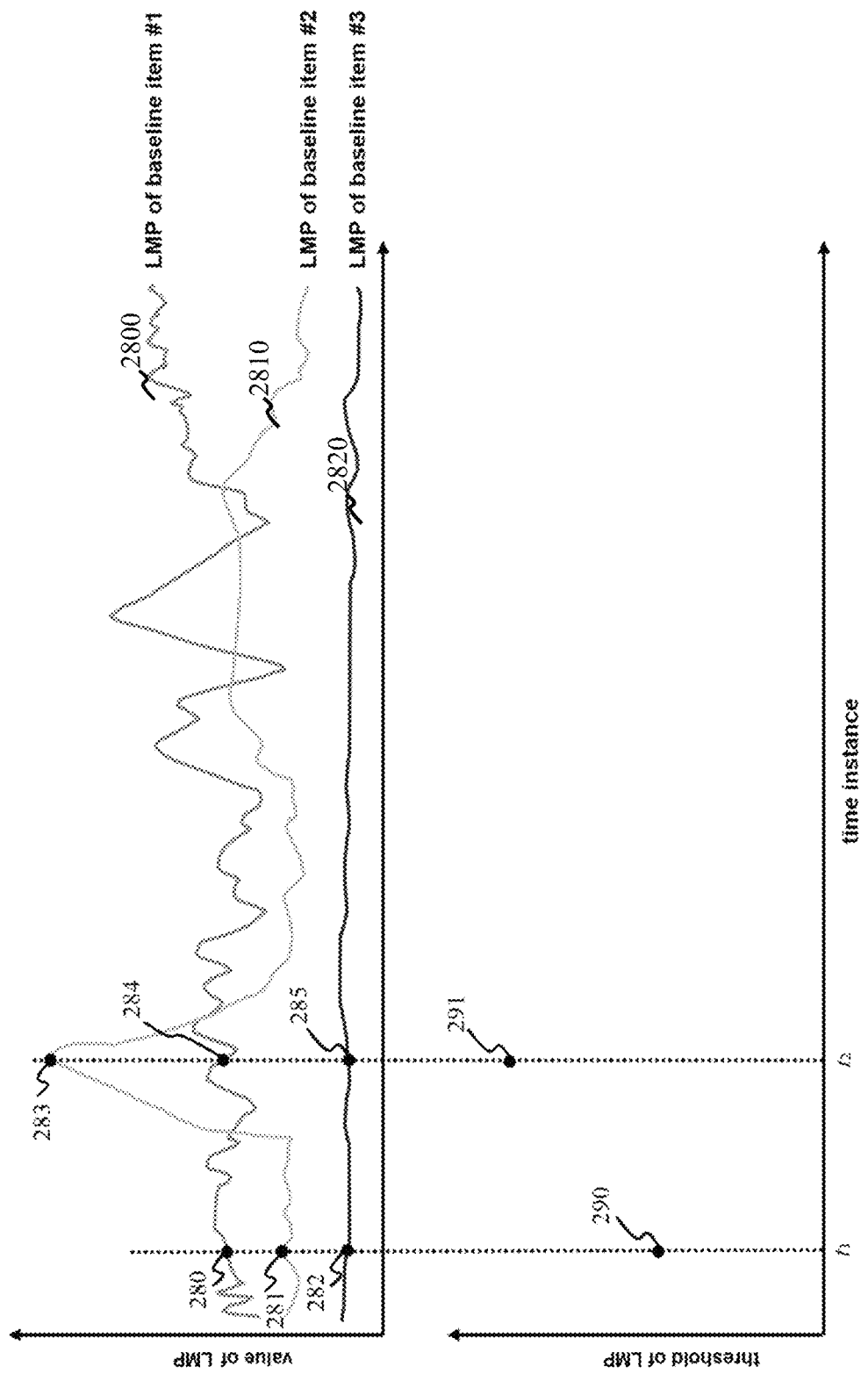
FIG. 2C shows a schematic of a method for determining thresholds of LMP values for a fault detector based on LMPs according to some embodiments.

FIG. 2C shows a schematic of a method for determining thresholds of LMP values for a fault detector based on LMPs according to some embodiments. In these example, the embodiments determine threshold values derived from the LMPs baseline items 2800, 2810, and 2820. For each time instance, the threshold of LMP can be taken as the maximum of the corresponding values of the LMPs of the baseline items. In particular, for time instance $t_1$, the maximum LMP value is at point 280 (since the point 280 is the highest among points 280, 281, and 282), so the threshold 290 is the same as the value of the LMP of baseline item 2800 at point 280. Also, for time instance $t_2$, the maximum LMP value is at point 283 (since the point 283 is the highest among points 283, 284, and 285), so the threshold 291 is the same as the value of the LMP of baseline item 2810 at point 283. Hence, the thresholds can be derived from different baseline LMPs. In addition, the thresholds of LMP values are themselves time-varying, forming a univariate time series.

Figure 2D:
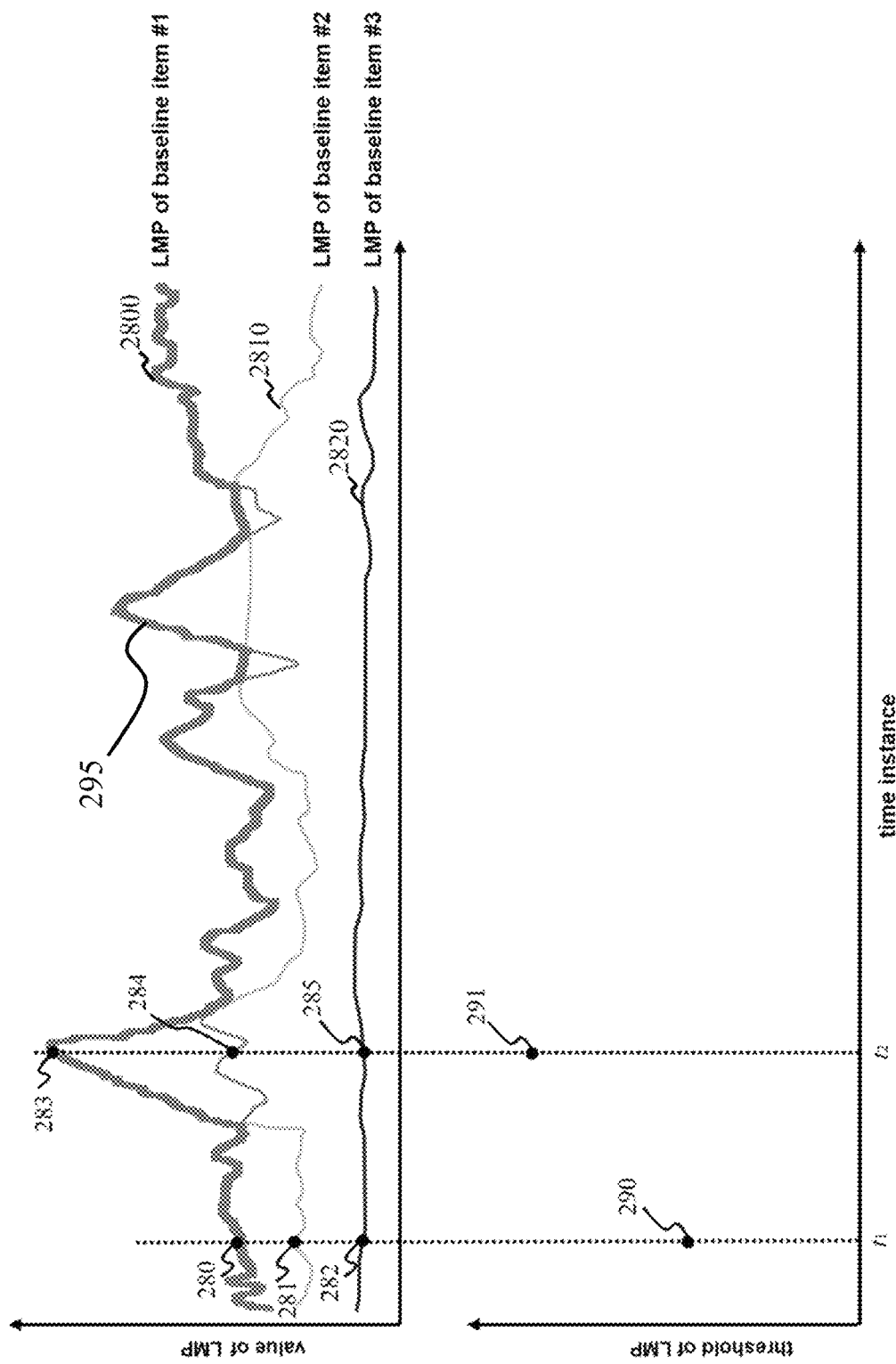
FIG. 2D shows a time series of thresholds determined for an example of FIG. 2C.

FIG. 2D shows a time series of thresholds determined for an example of FIG. 2C. As shown in FIGS. 2C and 2D, the thresholds form a time series which represents the tolerable variations among the normal time-varying signals in a time-dependent manner. As used herein, such a time series of thresholds is denoted LMPT 295, where "T" indicates threshold, and "LMP" indicates the thresholds are derived from the LMPs of normal time-varying signals. The time series of thresholds 295 is shown as bold curve in the top subfigure.

Dimensionality Reduction Using LMP

In some embodiments, LMP is determined for multivariate time series (MTS), which is the case, for example, when a time-varying signal includes measurements of different sensors of different types. For example, the operation of a machine can be represented by measurements of accelerometer, torque sensor, and position sensor. Formally, an MTS includes multiple UTS items, each UTS corresponding to a specific dimension. Notably, the LMP can be determined for MTS internally, i.e., a single value of LMP is determined from corresponding values of multiple time-series data. In such a manner, some embodiments reduce the dimensionality of the time series data as well as computational burden of statistical analysis on the time-varying signal.

In particular, some embodiments use an unsupervised method (i.e., for the purpose of calculating the weights, no labels for the input $L_{vis}$ MTS items $\tilde{a}^{(l)}$, $l=1, \ldots, L_{vis}$ are needed) which utilizes the properties of the Principal Components (PCs) and the Descriptive Common Principal Components (DCPCs) to preserve the correlation information among variables. The VISs of variables are calculated according to their contribution to the common principal components.

Figure 2E:
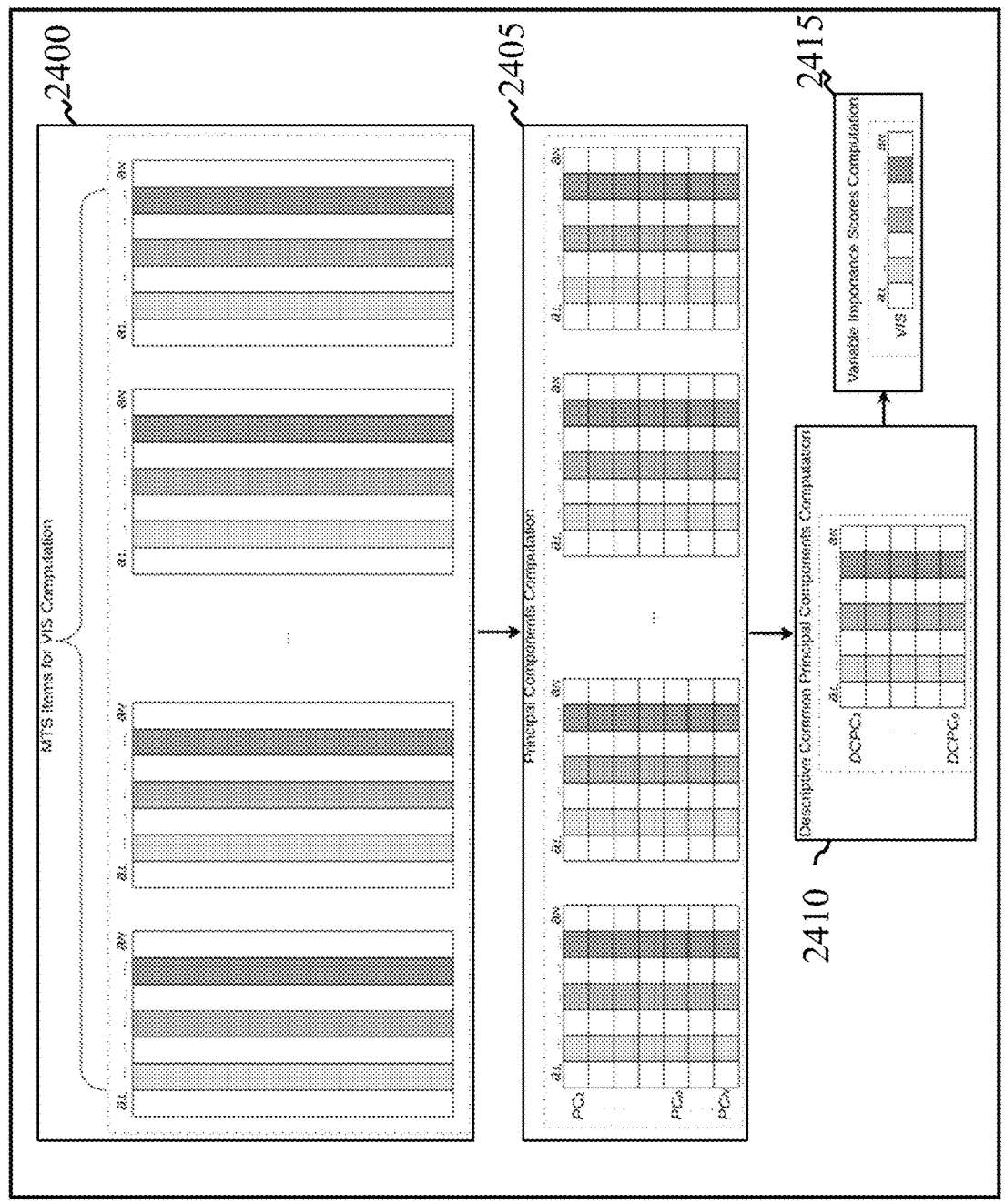
FIG. 2E shows a block diagram of a method for determining weights of different parameters of operation of the machine according to some embodiments.

FIG. 2E shows a block diagram of a method for determining weights of different parameters of operation of the machine according to some embodiments. In some implementations of the embodiments, the weights are determined offline, i.e., before the operation of the machine starts. In effect, the weighted calculation of LMPs for MTS items allows to reduce dimensionality in faults anomaly detection and classification.

For example, some embodiments take the unlabeled MTS items 2400 (i.e., $\tilde{a}^{(l)}=(\tilde{a}_n^{(l)}(t))$; [n=1, ..., N; t=1, ..., T], l=1, ..., $L_{vis}$) as its input, compute 2405 the Principal Components (PCs), and compute 2410 the Descriptive Common Principal Components (DCPCs) from the attained PCs. Next, the embodiments compute 2415 the Variable Importance Scores (VISs) based on the attained DCPCs.

In some embodiments, the weights of different parameters of operation of the machine 102 are determined as Variable Importance Scores (VISs) according to Algorithm 1.

---

Algorithm 1 Variable Importance Scores (VISs)

Input: $L_{vis}$ MTS items $\tilde{a}^{(l)}$, $l = 1, \ldots, L_{vis}$, each with length T; threshold $\delta$
1:  DCPC ← ∅
2:  for l = 1, ..., $L_{vis}$ do
3:      [U, S, U'] ← SVD(correlation matrix of $\tilde{a}^{(l)}$)
4:      loading(l) ← U    ▷ each entry of vector loading is a matrix
5:      variance ← diag (S)    ▷ vector variance contains the diagonal entries of S
6:      percentVar ← 100 × variance/sum(variance)
7:      cs ← 0    ▷ cs denotes cumulative sum of entries of percentVar
8:      for n = 1, ..., N do
9:          cs ← cs + percentVar(n)
10:         if cs ≥ $\delta$ then
11:             $p_l$ ← n
12:             break
13:         end if
14:     end for
15: end for

| Algorithm 1 Variable Importance Scores (VISs) |
|---|
| 16: $p \leftarrow \max\{p_1, \ldots, p_{L_{vis}}\}$ |
| 17: $H = O$ ▷ initialize H as a zero matrix |
| 18: for $l = 1, \ldots, L_{vis}$ do |
| 19:     $L(l) \leftarrow$ the first p rows of loading(l) |
| 20:     $H \leftarrow H + L(l)' \times L(l)$ |
| 21: end for |
| 22: $[V, \_, V'] \leftarrow SVD(H)$ |
| 23: DCPC $\leftarrow$ first p rows of V   ▷ DCPC is a p × N matrix; each column corresponds to a loading vector |
| 24: for $n = 1, \ldots, N$ do |
| 25:     $s(n) \leftarrow$ norm(DCPC loading vector of the n-th variable) |
| 26: end for |
| Output: VIS vector s |

Specifically, it first obtains PCs per MTS item and then DCPCs across them consecutively. The principal components of an MTS item is obtained by applying Singular Value Decomposition (SVD) to its correlation matrix in Line 3. Even though there are N PCs for each item, only the first p (<N) PCs, which are adequate for the purpose of representing each MTS item, are taken into consideration. In general, p is determined based on the percent ratio of the sum of the variances explained by the first p PCs to the total variance underlying the original MTS item, which ranges between 70 percent and 90 percent. Algorithm 1 takes the sum of variation, i.e., the threshold δ to determine p, as an input. That is, for each input MTS item, p is determined to be the minimum value such that the total variation explained by its first p PCs exceeds the provided threshold for the first time (Lines 8 through 14). Since the MTS items can have different values for p, p is finally determined as their maximum value in Line 16. (refer to 2400→2405→2410 of FIG. 2E)

Each MTS item is now represented as a p×N matrix whose rows are its first p PCs and columns represent variables. Note that each column of this matrix has a one-to-one correspondence to the original variable at the same position and describes the contributions of the corresponding variable to each of the p PCs. Then, the DCPC matrix is successively obtained through Lines 17 through 23. Finally, the VIS vector is determined by taking the $\ell_2$ norm of each and every DCPC loading vector (Lines 24 through 26; refer to 2415 of FIG. 2E).

Effect of LMP Comparison

Figure 3:
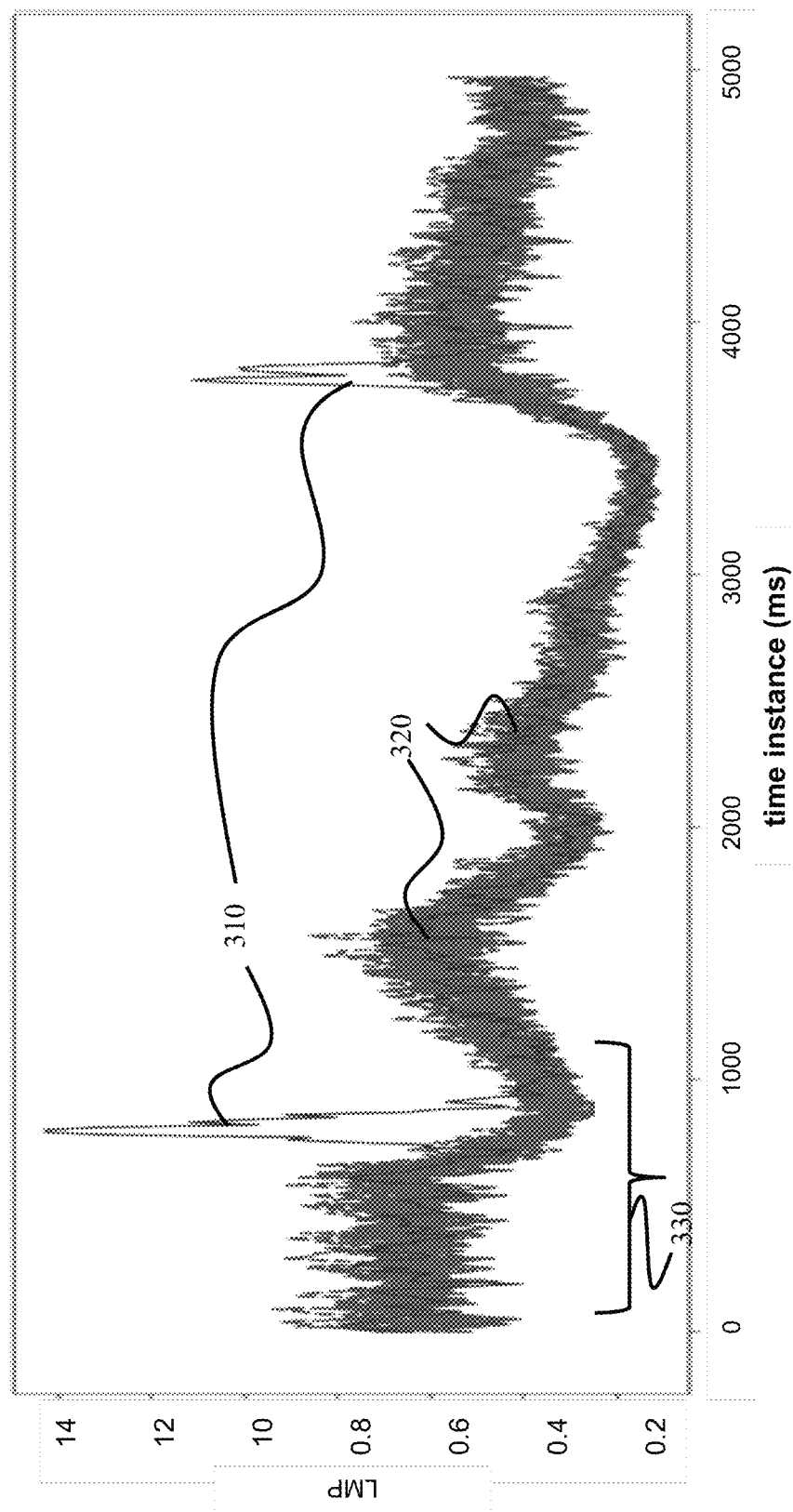
FIG. 3 shows a plot of comparative properties of LMP according to some embodiments.

FIG. 3 shows a plot of comparative properties of LMP according to some embodiments. Specifically, in some embodiments, the notion of LMP is extended to capturing statistical dissimilarities of a test time-varying signal with respect to multiple baseline time-varying signals. In these embodiments, each value of the LMP 310 of a test time-varying signal is a function of the differences between a segment of the test time-varying signal and the corresponding segments of the baseline time-varying signals. In addition, the LMP of the test signal can be compared with LPM of baselines signals 320. An LMP of a baseline signal is the LMP determine for the baseline signal with respect to other baseline signals. When baseline signals represent the same kind of success of the operation, e.g., a normal operation, or a faulty operation of a specific fault, the baseline signals themselves can differ, but their LMPs 320 are more clustered. Even visually, as shown in FIG. 3, the comparison between LMP of the test signal 310 with LMPs of baseline signals 320 is more telling.

To that end, some embodiments determine a LMP 310 of the input signal with respect to the baseline signals and detect an anomaly when an accumulation of the local errors over a period of time 330 is greater than an anomaly detection threshold determined as LMPT based on variations of the LMPs 320 of baseline signals. In some embodiments, the length of the period of time 330 is selected to include multiple LMPs values to capture not only local, but global dynamic. In such a manner, the detection errors are reduced.

For example, the length of the segment of the input signal for determining an LMP value and the length of the period of time for the local errors accumulation are operation specific. For example, these lengths depend on a low and high frequency components of operation of the machine, allowed variations of operation of the machine, and various transient and steady states of the operation. Typically, the length of the segment of the input signal is less than the length of the period of time for the local errors accumulation to emphasize accumulation of the local errors over the value of each of the local error. However, such a relationship can vary for different types of machines.

Some embodiments determine the length of the segment of the input signal and the length of the period of time for the local errors accumulation based on knowledge of the physics of operation of the machine. For example, in one embodiment, the machine includes an elevator door and the operation of the machine includes opening and closing the elevator door. In this embodiment, the length of the segment of the input signal is at least twice as less than the length of the period of time for the local errors accumulation. This relationship is determined based on specifics of opening and closing operations.

Anomaly Detection Using LMP

Figure 4A:
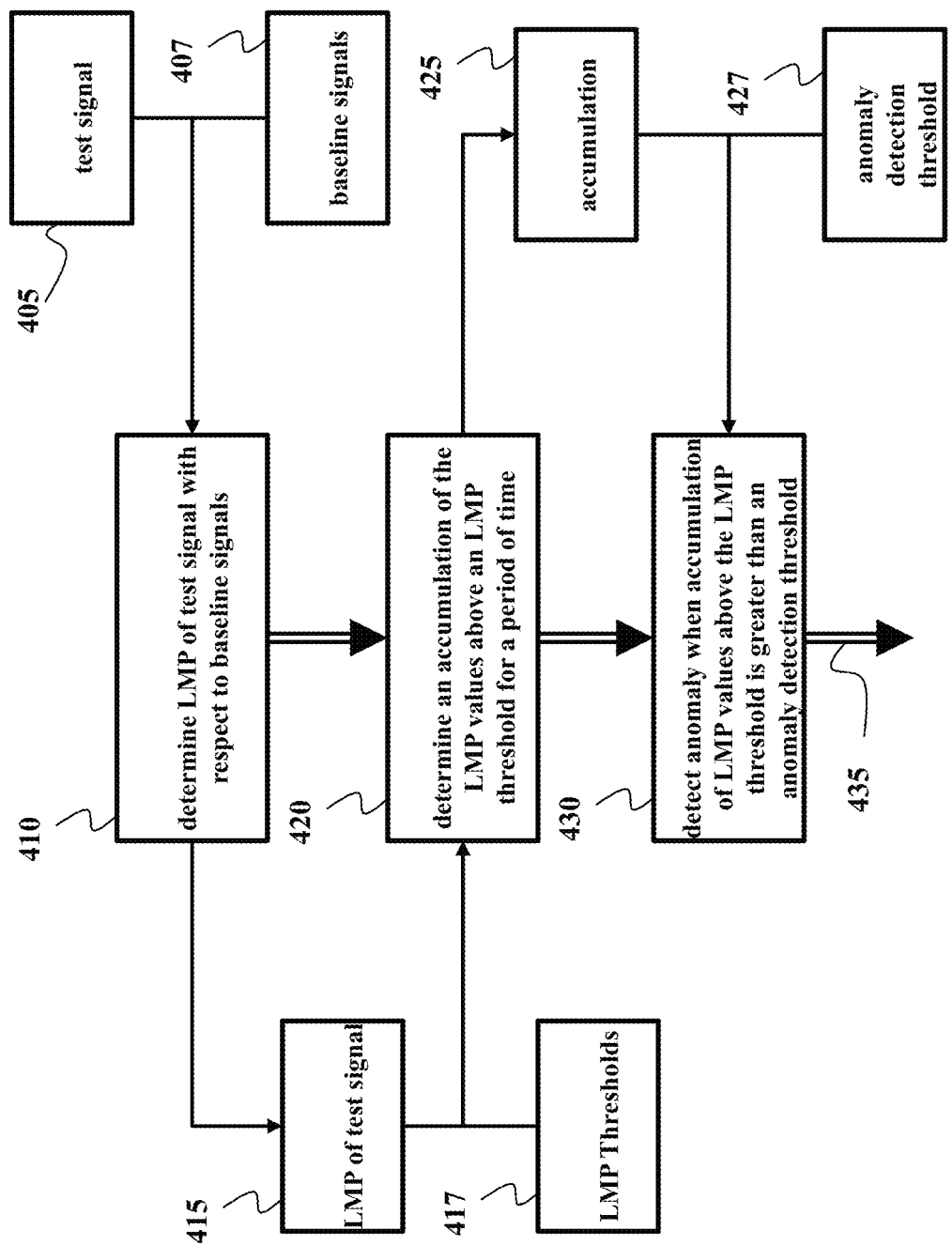
FIG. 4A shows a block diagram of a method for anomaly detection based on LMPs according to some embodiments.

FIG. 4A shows a block diagram of a method 400 for anomaly detection based on LMPs according to some embodiments. The method is performed by a processor 120 of the system 100. The method determines 410 a local matrix profile (LMP) 415 of the test signal 405 with respect to the baseline signals 407. In some embodiments, the method is performed during an operation of the machine 102, and the test signal 405 includes measurements of the current operation. In contrast, however, the baseline signals 407 are signals of previous successful executions of the operation.

The determined LMP 415 is a time series of LMP values, each LMP value for a time instance is determined for a segment of the test signal at the time instance based on a minimum distance between the segment of the test signal with corresponding segments of the baseline signals at the time instance. The signals 405 and 407 are synchronize in time. Also, the segment of the test signal and the corresponding segments of the baseline signals have the same length and the same positions with respect to the time instance. For example, the positions of the segments of the test signal and the baseline signals at the time instance are centered on the values of the test signal and the baseline signals at the time instance, starts at the values of the test signal and the baseline signals at the time instance, or ends at the values of the test signal and the baseline signals at the time instance. In such a manner, each LMP value is a value of a local dissimilarity of the execution of the operation of the machine with respect to the baseline executions of the operation of the machine.

Next, the method determines 420 the accumulation 425 of the LMP values above an LMP threshold 417 for a period of time. Notably, the values of the LMP threshold vary for different instances of time forming a time series of LMP thresholds. Each value of the LMP threshold at the instance of time is a maximum value of LMPs of the baseline signals at the instance of time. Because, LMP of a given baseline signal is calculated with respect to all of the baseline signals excluding the given baseline signal itself, the LMP thresholds reflect allowable variations in the operations of the machine.

Next, the method detects 430 an anomaly 435 when the accumulation 425 of the LMP values above the LMP thresholds for the period of time is greater than an anomaly detection threshold 427 to produce a result of anomaly detection 435. In effect, the new statistical primitive of LMP, time-series of LMP thresholds and accumulation of the LMP values above the LMP thresholds increases the accuracy of anomaly detection.

Figure 4B:
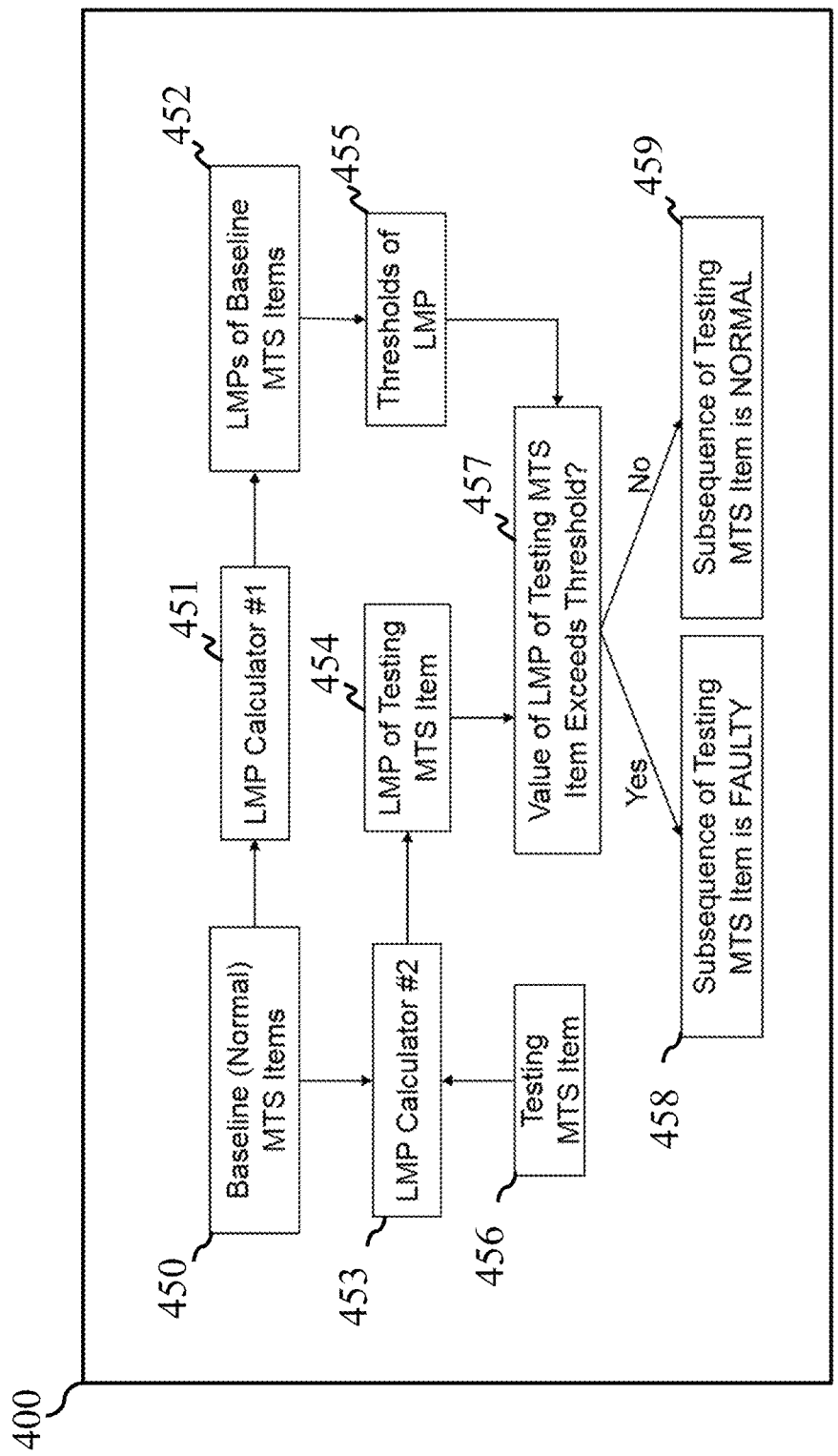
FIG. 4B shows a block diagram of a method for fault detection based on LMPs according to one embodiment.

FIG. 4B shows a block diagram of a method 400 for fault detection based on LMPs according to one embodiment. The LMP calculator 451 computes the LMPs 452 of the baseline items 450 $a^{(l)}=(a_n^{(l)}(t))$; [n=1, ..., N; t=1, ..., T], l=1, ..., L). In these embodiments, the baseline items represent normal time-varying signals. The normal time-varying signals can be univariate time series (UTS) refers to one-dimensional time series generated by one single sensor (or one single type of sensors) in time-varying operations of a physical system. The term multivariate time series (MTS) refers to multidimensional time series generated by multiple sensors (or multiple types of sensors) in time-varying operations of a physical system. Note that the UTS is actually a special case of MTS, and therefore this disclosure uses MTS to denote time series gathered from one or multiple sensors of the same or different types.

Specifically, the LMPs 452 include $\langle a^{(k)}, \{a^{(l)}; l=1, ..., L\}\backslash\{a^{(k)}\}\rangle_{LMP}$, k=1, ..., L. Note that these are LMPs of the baseline MTS items themselves, which would imply time-dependent ranges of tolerable variations among the normal runs of a machine operation and, in turn, provide a guidance for setting the thresholds of LMP 455. For example, for any given $\xi \in \{1, ..., T-M+1\}$, some embodiments take the maximum of the $\xi$-th entry in the LMPs $\langle a^{(k)}, \{a^{(l)}; l=1, ..., L\}\backslash\{a^{(k)}\}\rangle_{LMP}$, k=1, ..., L, as an initial estimation of the threshold $g_\xi^*$. Note also that in some embodiments, these computations are done offline.

Upon receiving a test signal 456, such as a signal b in $\{b^{(l)}=(b_n^{(l)}(t)); [n=1, ..., N; t=1, ..., T], l=1, ..., L_{test}\}$, the LMP calculator 453 computes the LMP 454 $\langle b, \{a^{(l)}; l=1, ..., L\}\rangle_{LMP}$ of b 456 with respect to the baseline (e.g., normal) set $\{a^{(l)}=(a_n^{(l)}(t)); [n=1, ..., N; t=1, ..., T], l=1, ..., L\}$ 450.

The embodiments detect an anomaly when an accumulation of the local errors over a period of time is greater than an anomaly detection threshold. For example, for any given subsequence over a period of time 330 $\xi \in \{1, ..., T-M+1\}$, the embodiments test 454 if the $\xi$-th entry of $\langle b, \{a^{(l)}; l=1, ..., L\}\rangle_{LMP}$ is greater 457 than the threshold $\lambda \times g^*_\xi$ 455. If true 458, the embodiments detect a fault at time instance $\xi$ for testing MTS item b. Otherwise 459, b is normal at time instance $\xi$. Here, $\lambda \geq 0$ is a parameter (default value is 1) that could be tuned, for example, by means of cross-validation, which is a widely used machine learning approach. The parameter $\lambda$ is to increase robustness of the threshold. Tuning the threshold determined from LMPs of baseline signals oftentimes make the detection more accurate.

Fault Classification Using LMP

Figure 5:
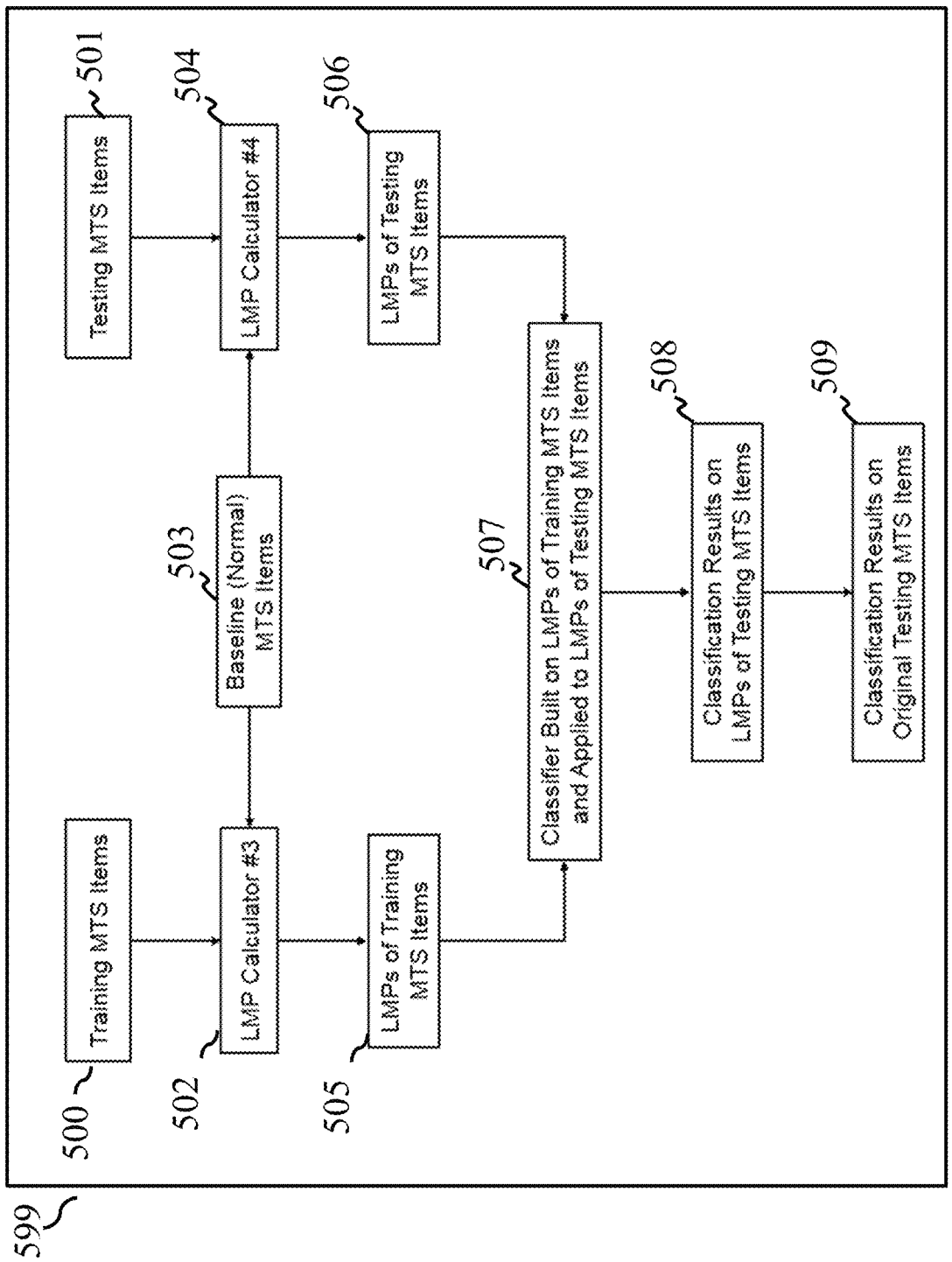
FIG. 5 shows a block diagram of a method for fault classification based on LMPs according to some embodiments.

FIG. 5 shows a block diagram of a method 599 for fault classification based on LMPs according to some embodiments. In some embodiments, the memory stores LMPs of faulty signals of unsuccessful executions of the operation of the machine, wherein the LMPs of faulty signals are grouped based on a type of the fault, and the method 599, upon detecting the anomaly, compares the LMP of the test signal with LMPs of faulty signals to classify the fault.

For example, the LMP calculator 502 computes the LMPs 505 $\langle \tilde{b}^{(k)}, \{a^{(l)}; l=1, ..., L\}\rangle_{LMP}$, k=1, ..., $L_{train}$, of the labeled training MTS items 500 $\tilde{b}^{(l)}=(\tilde{b}^{(l)}(t))$; [n=1, ..., N; t=1, ..., T],l=1, ..., $L_{train}$. The LMPs 505 can be determined alternatively or in addition to determination of LMPs of the normal MTS set 503 $\{a^{(l)}=(a_n^{(l)}(t)); [n=1, ..., N; t=1, ..., T], l=1, ..., L\}$. In different embodiments, the labeled training MTS items 500 are faulty items determined for each type of fault to classify. Similarly to LMPs of baseline items of FIG. 4, the LMPs 505 can be determined offline.

Online, during the operation of the machine 102, upon receiving a test item 501, in some embodiments, the LMP calculator 504 computes the LMPs 506 $\langle b^{(k)}, \{a^{(l)}; l=1, ..., L\}\rangle_{LMP}$, k=1, ..., $L_{test}$, of the unlabeled testing MTS items 501 $b^{(l)}=(\tilde{b}_n^{(l)}(t))$; [n=1, ..., N; t=1, ..., T], l=1, ..., $L_{test}$.

After obtaining LMPs of faulty training items 505 of each fault and testing items 506, a classifier 507 compares the LMPs 505 and 506 to classify a specific fault. The classification results 508 on the LMPs of the testing MTS items can then be converted to classification results 509 on the original testing MTS items. Note that the classifier 507 could be chosen as per users' preferences. For example, one could choose a shapelet based approach or any other general time series classifier. The comparison of LMPs of the test and faulty signals is more indicative than the comparison of the signals themselves. In effect, such a classification is more accurate.

Figure 6:
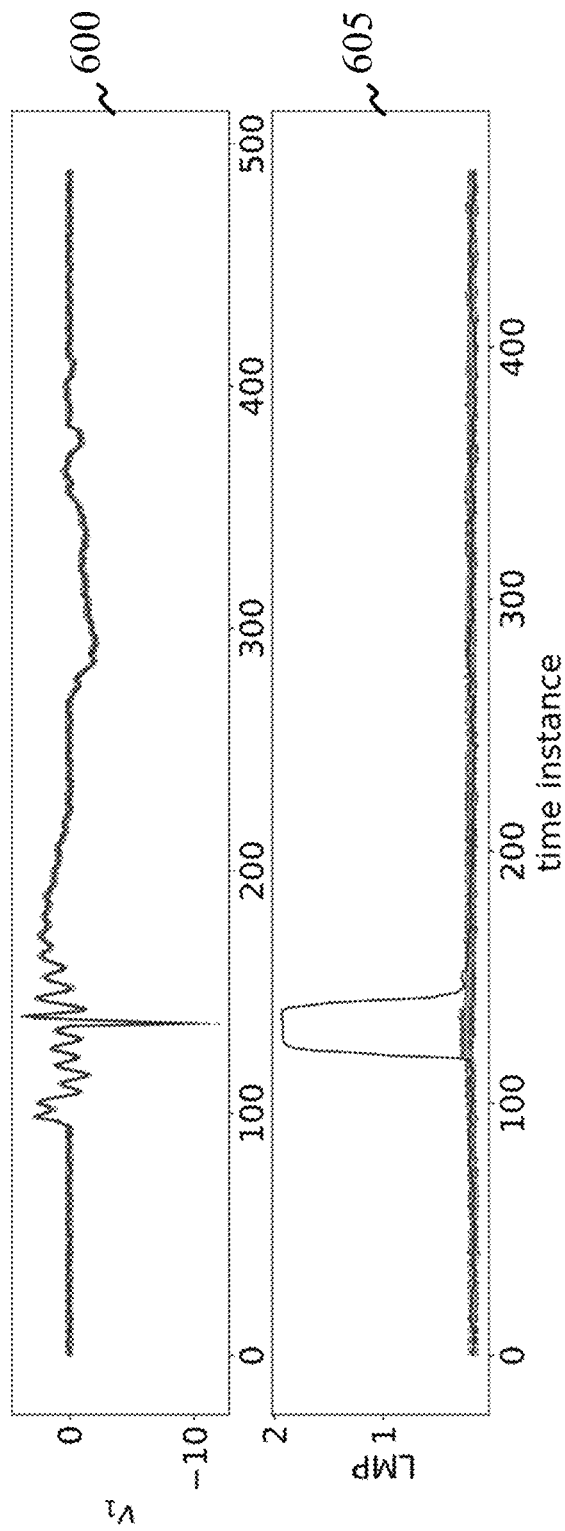
FIG. 6 shows a graph illustrating an exemplar testing MTS item, a set of exemplar baseline MTS items, and their LMPs with respect to the baseline MTS items, according to one embodiment.

FIG. 6 shows a graph illustrating UTS of one variable $v_1$ of an exemplar testing MTS item (refer to the red solid curve of 600), a set of exemplar baseline MTS items (refer to the remaining dashed curves of 600), and their LMPs (refer to the red solid curve and the remaining dashed curves of 605 respectively) with respect to the baseline MTS items, according to one embodiment. In this embodiment a set of baseline MTS items include measurements of different variables of operation of the machine.

Figure 7:
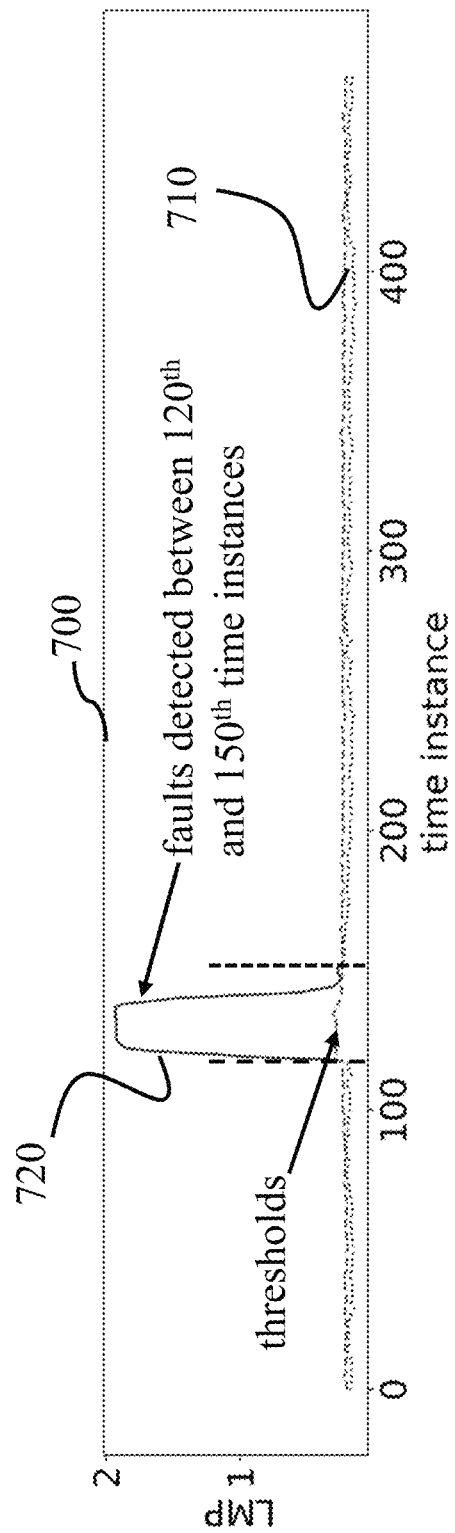
FIG. 7 shows a graph of fault detection using the LMP of FIG. 6.

FIG. 7 shows a graph 700 of fault detection using the LMP of FIG. 6. The graph 700 shows the LMP values of the same sample testing MTS item as that in FIG. 6 and the thresholds determined by the computed LMPs of the same set of sample baseline MTS items as those in FIG. 6, with the default threshold factor $\lambda=1$. The thresholds 710 is determined from baseline items of normal operation to indicate a detected fault 720.

It is seen from 600 of FIG. 6 that the values of the variables in the set of sample baseline MTS items are very close, and they are also close to those of the sample testing MTS item. On the other hand, it is seen from 605 that, at certain time instances, the values of the LMP of the sample testing MTS item are deviating significantly from the LMPs of the set of sample baseline MTS items; these deviations indicate faulty windows detected between the 120-th and 150-th time instances. This demonstrates that, as a primitive for MTS fault detection, the LMPs have a good discriminatory property, hence, ensuring the effectiveness of the LMP-based fault detector.

Figure 8:
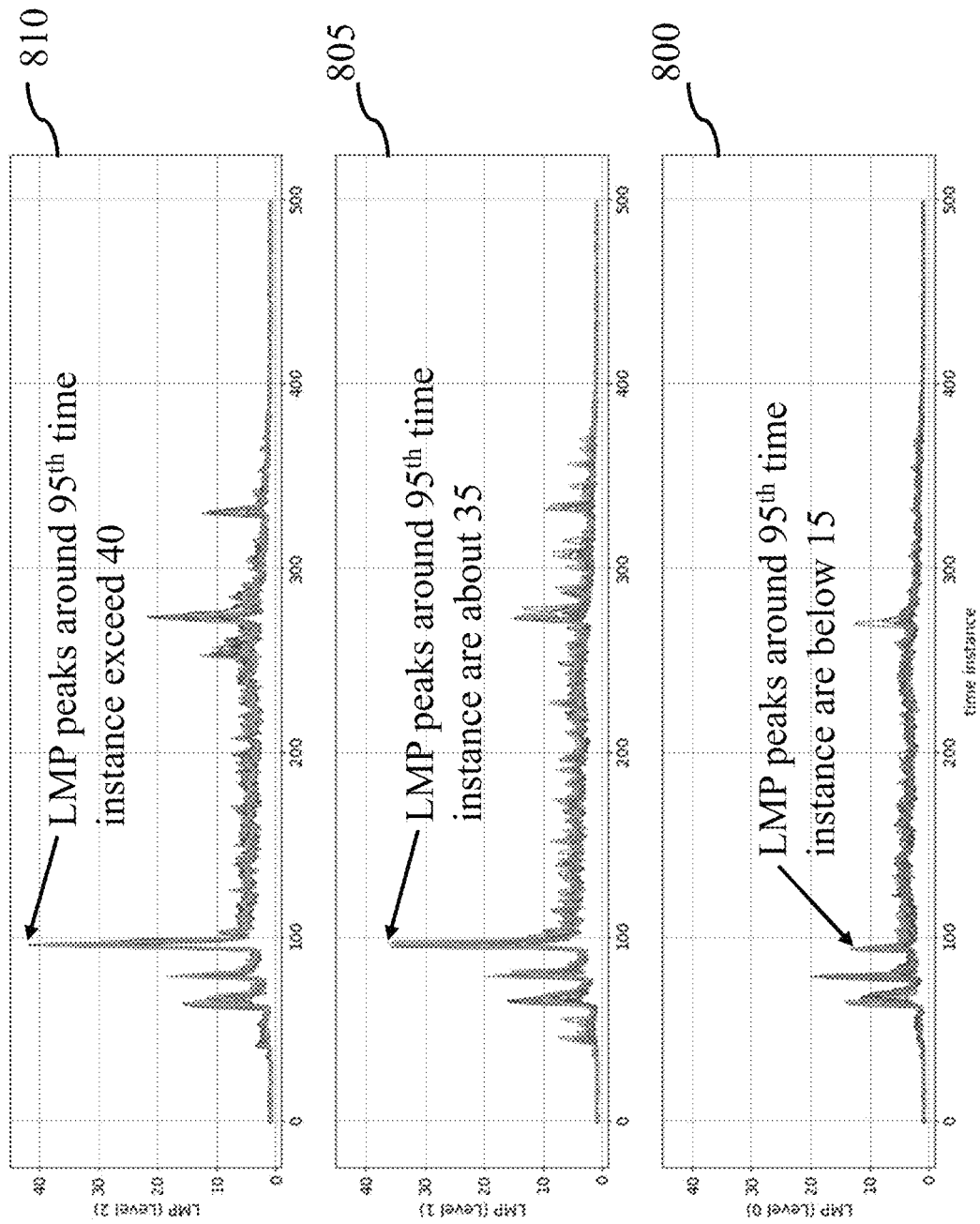
FIG. 8 shows graphs illustrating the LMPs of sample training MTS items with three different labels for fault classification according to some embodiments.

FIG. 8 shows graphs illustrating the LMPs of sample training MTS items with three different labels (deterioration levels) for fault classification, according to some embodiments. From 800, 805, and 810 of FIG. 8, it is seen that the curves of LMPs of the sample training MTS items with different deterioration levels appear significantly different. In particular, referring to the peaks of the LMP values around the 95-th time instance, it is seen that the peaks of level 0 LMPs are below 15, of level 1 LMPs are about 35, and of level 2 LMPs are above 40. This shows that the LMPs, as a primitive for MTS classification, are also significantly discriminatory, hence, ensuring the effectiveness of the LMP-based fault classifier.

Exemplar Embodiment

Figure 9A:
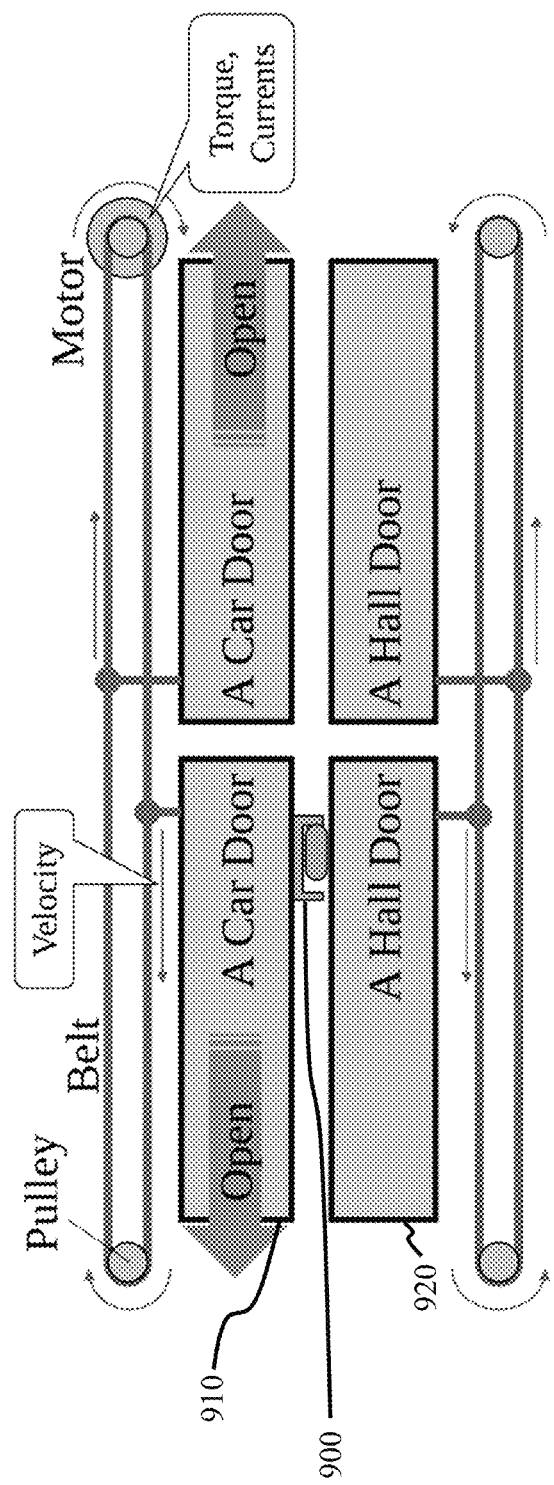
FIG. 9A shows an exemplar of a machine controlled according to some embodiments.

FIG. 9A shows an exemplar of a machine 102 controlled according to some embodiments. In this example, the machine 102 includes a mechanism of opening doors of elevators (view from the top). The mechanism of closing doors of elevators is essentially similar. The connector 900 is engaging a car door 910 and a hall door 920. A car door and a hall door are usually separated. When doors begin to open, the car door would engage with the hall door and move together. Sensors are deployed to record multiple physical variables.

In this example, time-varying signals are collected over time from measuring the performance of repeatedly opening and closing an elevator door. If the operations of opening and closing an elevator door have been considered successful—without anomalies or faults, the measurements of those operations become normal time-varying signals.

In addition, the data here we use for demonstration are synthetic and generated corresponding to the elevator doors' opening process with different levels of deterioration for a certain component of the elevator. Some embodiments consider 6 levels of deterioration in total, and we generate 600 MTS items (indexed by 1, . . . , 600) for each level, where each MTS item contains 490 time instances (the sampling frequency is 100 Hz) and 5 physical variables denoted by $v_n$, $n=1, \ldots, 5$, respectively.

The lower the deterioration level, the healthier the elevator door's status is. In some implementations, the level 0 data are "normal," and the data whose level exceeds 1 are "faulty;" the data with level 1 are in an "in-between" status. To remove effects of the units of physical variables, some embodiments preprocess each and every MTS item by z-normalizing the time series of each and every variable. Henceforth, the MTS items in this example include preprocessed measurements of the operation of the elevator door.

VIS Computation

To compute the VIS vector s, some embodiments use the MTS items indexed 1, . . . , 200 for each and every level; thus, we use 200×6=1200 MTS items in total. After obtaining the variable importance scores by applying Algorithm 1, we normalize the VIS vector and end up with s=(0.2323, 0.2306, 0.2316, 0.0879, 0.2176). It is seen that the physical variable $v_1$ refer to 600 of FIG. 6) has the highest importance score.

Anomaly Detection

To conduct fault detection, some embodiments only use the abovementioned synthetic data with levels among {0, 2, 3, 4, 5}. The query length M is set to be 20 in LMP computations; this number is determined by a few trials. To obtain the baseline LMPs, some embodiments use the MTS items indexed 201, . . . , 400 with level 0. The MTS items indexed 401, . . . , 600 are used for testing. For economy of space, we only show results for data with level 2; the results for data with levels 3, 4, 5 are similar and omitted.

Let us revisit FIG. 6 and FIG. 7. In the top subfigure 600 of FIG. 6, the values of a selected variable $v_1$ in the baseline MTS items are plotted as dashed lines. In the bottom subfigure 605 of FIG. 6, we show the values of the LMPs of the baseline MTS items as dashed lines. In each and every subfigure of FIG. 6, we superimpose the corresponding values of the variable or LMP of the testing MTS item indexed 401 with ground truth level 2 (faulty) as a red solid line. In FIG. 7, we show the LMP values of the same testing item and the thresholds determined by the computed baseline LMPs; we take the factor $\lambda=1$. It is seen from FIG. 6 that the values of the selected variable in the original baseline MTS items are very close, and they are also close to those of the testing MTS item, while, at certain time instances, the values of the LMP of the testing MTS item are deviating significantly from the LMPs of the baseline MTS items; these deviations indicate faulty windows (see FIG. 7 for the red curve between time instances 120 and 150). This demonstrates the effectiveness of the LMP-based anomaly detector.

Fault Classification

To conduct fault classification, some embodiments use the abovementioned synthetic MTS items indexed 201, . . . , 400 with level 0 as normal baseline MTS items. The MTS items indexed 401, . . . , 500 (resp., 501, . . . , 600) with all 6 levels are used for training (resp., testing). The query length M is also taken as 20. The embodiments compute LMPs of all the training and testing MTS items with respect to the 200 baseline MTS items. Thus, the embodiments determine 600 training LMPs (100 for each level) and 600 testing LMPs (100 for each level). Then, the embodiments build a shapelet-based multi-label classifier upon the 600 training LMPs and apply it to predict the level of each and every testing LMP.

FIG. 9B shows the confusion matrix 930 summarizing the fault classification results for an exemplar embodiment of FIG. 9A. The confusion matrix 930 shows that, for items with ground-truth levels greater than or equal to 2, the classification is highly accurate; only one level 5 item is misclassified as level 4. The testing items with ground-truth level 0 are also classified with a high accuracy (96%); only 4 items are misclassified as level 1. On the other hand, the data with ground-truth level 1 are easy to be misclassified as level 0; this is due to the fact that, in an "in-between" status, the original data of level 1 are actually very close to those of level 0.

Figure 10:
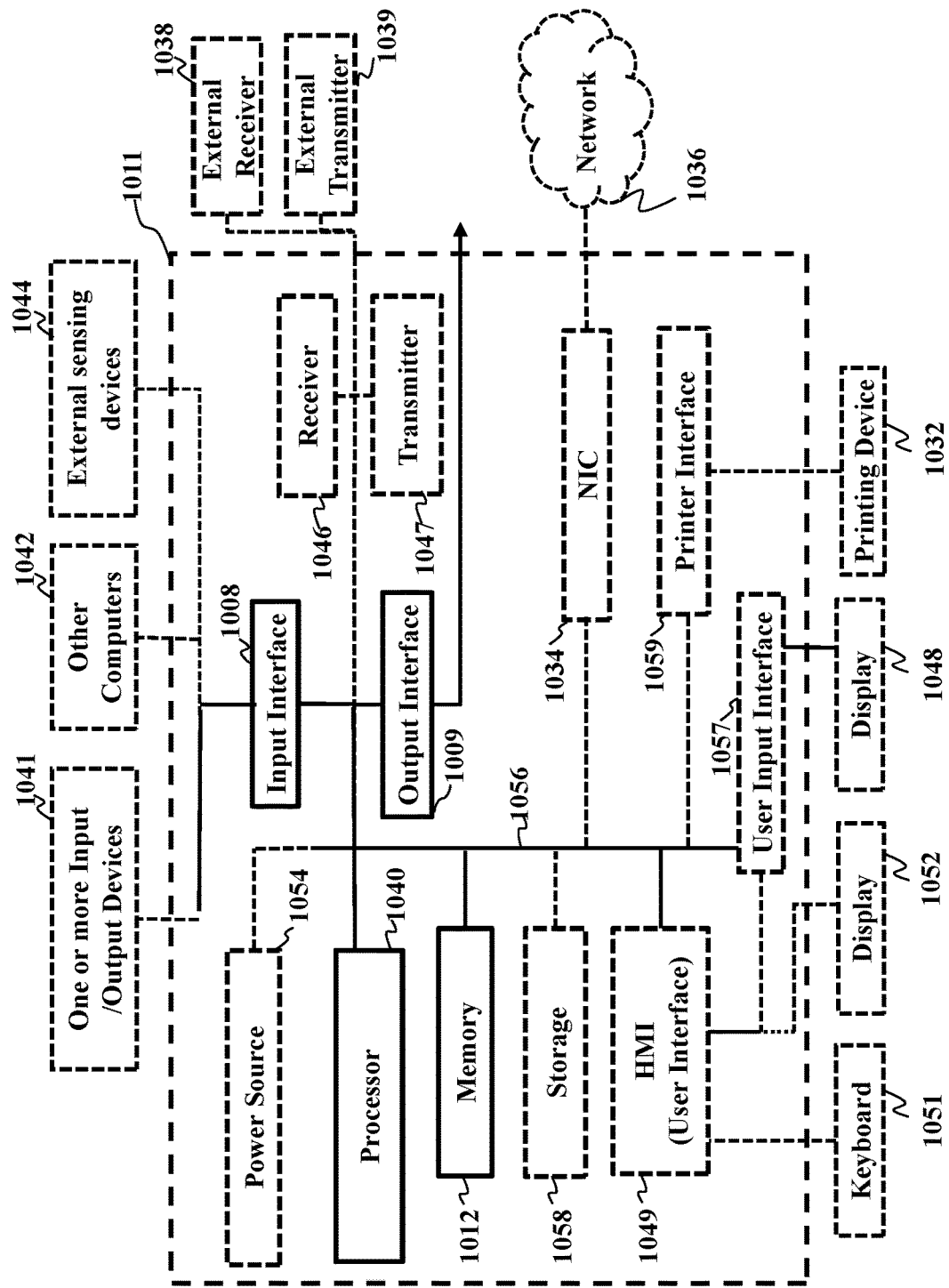
FIG. 10 is a block diagram of components of a system of FIG. 1A, that can be implemented using an alternative computer or processor according to embodiments.

FIG. 10 is a block diagram of components of a system of FIG. 1A, that can be implemented using an alternative computer or processor, according to embodiments. The computer 1011 includes a processor 1040, computer readable memory 1012, storage 1058 and user interface 1049 with display 1052 and keyboard 1051, which are connected through bus 1056. For example, the user interface 1049 in communication with the processor 1040 and the computer readable memory 1012, acquires and stores the set of MTS items in the computer readable memory 1012 upon receiving an input from a keyboard surface 1051, of the user interface 1049 by a user.

The computer 1011 can include a power source 1054, depending upon the application the power source 1054 may be optionally located outside of the computer 1011. Linked through bus 1056 can be a user input interface 1057 adapted to connect to a display device 1048, wherein the display device 1048 can include a computer monitor, camera, television, projector, or mobile device, among others. A printer interface 1059 can also be connected through bus 1056 and adapted to connect to a printing device 1032, wherein the printing device 1032 can include a liquid inkjet printer, solid ink printer, large-scale commercial printer, thermal printer, UV printer, or dye-sublimation printer, among others. A network interface controller (NIC) 1034 is adapted to connect through the bus 1056 to a network 1036, wherein MTS data or other data, among other things, can be rendered on a third party display device, third party imaging device, and/or third party printing device outside of the computer 1011.

Still referring to FIG. 10, the MTS data or other data, among other things, can be transmitted over a communication channel of the network 1036, and/or stored within the storage system 1058 for storage and/or further processing. Further, the MTS data or other data may be received wirelessly or hard wired from a receiver 1046 (or external receiver 1038) or transmitted via a transmitter 1047 (or external transmitter 1039) wirelessly or hard wired, the receiver 1046 and transmitter 1047 are both connected through the bus 1056. The computer 1011 may be connected via an input interface 1008 to external sensing devices 1044 and external input/output devices 1041. For example, the external sensing devices 1044 may include sensors gathering data before-during-after of the collected MTS data of the machine. For instance, environmental conditions approximate the machine or not approximate the machine, i.e., temperature at or near machine, temperature in building of location of machine, temperature of outdoors exterior to the building of the machine, video of machine itself, video of areas approximate machine, video of areas not approximate the machine, and other data related to aspects of the machine. The computer 1011 may be connected to other external computers 1042. An output interface 1009 may be used to output the processed data from the processor 1040.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A system for detecting an anomaly in an execution of an operation of a machine, comprising:
   an input interface configured to input a test signal including a time series of measurements of an operation of the machine;
   a memory configured to store a set of baseline signals, each baseline signal includes a time series of measurements of a baseline execution of the operation of the machine;
   a hardware processor configured to
      determine a statistical primitive as a local matrix profile (LMP) indicative of time-varying fluctuation of the test signal with respect to the baseline signals using a first sliding window method over the test signal and the baseline signals synchronized in time, wherein the LMP is a time series of LMP values, each LMP value for a time instance is determined for a segment of the test signal within a window of the first sliding window method at the time instance based on a minimum distance between the segment of the test signal with corresponding segments of the baseline signals within the window at the time instance, such that each LMP value is a value of a local dissimilarity of the execution of the operation of the machine with respect to the baseline executions of the operation of the machine;
      compare the statistical primitive with an LMP threshold using a second sliding window method over the LMP values to determine an accumulation of the LMP values above the LMP threshold for a period of time governed by a length of a window in the second sliding window method; and
      detect an anomaly when the accumulation of the LMP values above the LMP threshold for the period of time is greater than an anomaly detection threshold to produce a result of anomaly detection; and
   an output interface configured to output the result of the anomaly detection.

2. The system of claim 1, wherein values of the LMP threshold vary for different instances of time forming a time series of LMP thresholds, wherein a value of the LMP threshold at the instance of time is a maximum value of LMPs of the baseline signals at the instance of time, wherein a LMP of a given baseline signal is calculated with respect to all of the baseline signals excluding the given baseline signal itself.

3. The system of claim 1, wherein each baseline signal includes measurements of a normal operation of the machine, such that the baseline execution of the operation of the machine is a successful execution of the operation of the machine.

4. The system of claim 1, wherein the segment of the test signal and the corresponding segments of the baseline signals have the same length and the same positions with respect to the time instance.

5. The system of claim 4, wherein the positions of the segments of the test signal and the baseline signals at the time instance are centered on the values of the test signal and the baseline signals at the time instance, starts at the values of the test signal and the baseline signals at the time instance, or ends at the values of the test signal and the baseline signals at the time instance.

6. The system of claim 1, wherein the segment of the test signal includes multiple measurements, wherein the period of time for the accumulation includes multiple LMP values.

7. The system of claim 1, wherein the accumulation is a function of the LMP values within the period of time.

8. The system of claim 1, wherein the processor determines the LMP of the test signal by iteratively shifting the window of the first sliding method of a length of the segment over the test signal, wherein a current LMP value at a current iteration is a function of a previous LMP value at a previous iteration, an old shift value of the LMP determined for an old shift of the window that is no longer part of the window, and a new shift value of the LMP determined for the newly added part of the window.

9. The system of claim 1, wherein the test signal and the baseline signals include multiple univariate time series (UTS) signals from different sensors of different types, such that the test signal and the baseline signals are multivariate time series (MTS) signals.

10. The system of claim 9, wherein the LMP of the test signal is determined as a minimum of weighted Euclidean distances between the segments of the corresponding UTS signals.

11. The system of claim 10, wherein weights of the weighted Euclidean distance are determined using a principal components analysis of measurements of the operation of the machine.

12. The system of claim 1, wherein the memory stores LMPs of faulty signals of unsuccessful executions of the operation of the machine, wherein the LMPs of faulty signals are grouped based on a type of the fault, and wherein the processor, upon detecting the anomaly, compares the LMP of the test signal with LMPs of faulty signals to classify the fault.

13. The system of claim 1, wherein the LMPs of faulty signals are determined with respect to the baseline signals.

14. The system of claim 1, wherein the machine includes a mechanism for operating an elevator door and the operation of the machine includes opening and closing the elevator door.

15. The system of claim 1, wherein the processor is configured to control the machine based on the result of anomaly detection.

16. A method for detecting an anomaly in an execution of an operation of a machine, wherein the method uses a processor coupled with stored instructions implementing the method, wherein the instructions, when executed by the processor carry out steps of the method, comprising:
  accepting a test signal including a time series of measurements of an operation of the machine;
  determining a statistical primitive as a local matrix profile (LMP) indicative of time-varying fluctuation of the test signal with respect to a set of baseline signals using a first sliding window method over the test signal and the baseline signals synchronized in time, wherein each baseline signal includes a time series of measurements of a baseline execution of the operation of the machine, wherein the LMP is a time series of LMP values, each LMP value for a time instance is determined for a segment of the test signal within a window of the first sliding window method at the time instance based on a minimum distance between the segment of the test signal within the window with corresponding segments of the baseline signals within the window at the time instance, such that each LMP value is a value of a local dissimilarity of the execution of the operation of the machine with respect to the baseline executions of the operation of the machine;
  comparing the statistical primitive with an LMP threshold using a second sliding window method over the LMP values to determine an accumulation of the LMP values above the LMP threshold for a period of time governed by a length of a window in the second sliding window method; and
  detecting an anomaly when the accumulation of the LMP values above the LMP threshold for the period of time is greater than an anomaly detection threshold to produce a result of anomaly detection; and
  outputting the result of the anomaly detection.

17. The method of claim 16, wherein values of the LMP threshold vary for different instances of time forming the time series of LMP thresholds, wherein a value of the LMP threshold at the instance of time is a maximum value of LMPs of the baseline signals at the instance of time, wherein a LMP of a given baseline signal is calculated with respect to all of the baseline signals excluding the given baseline signal itself.

18. The method of claim 16, wherein the test signal and the baseline signals include multiple univariate time series (UTS) signals from different sensors of different types, such that the test signal and the baseline signals are multivariate time series (MTS) signals, and wherein the LMP of the test signal is determined as a minimum of Weighted Euclidean Distances between the segments of the corresponding UTS signals.

19. A non-transitory computer-readable storage medium embodied thereon a program executable by a processor for performing a method, the method comprising:
  accepting a test signal including a time series of measurements of an operation of the machine;
  determining a statistical primitive as a local matrix profile (LMP) indicative of time-varying fluctuation of the test signal with respect to a set of baseline signals using a first sliding window method over the test signal and the baseline signals synchronized in time, wherein each baseline signal includes a time series of measurements of a baseline execution of the operation of the machine, wherein the LMP is a time series of LMP values, each LMP value for a time instance is determined for a segment of the test signal within a window of the first sliding window method at the time instance based on a minimum distance between the segment of the test signal within the window with corresponding segments of the baseline signals within the window at the time instance, such that each LMP value is a value of a local dissimilarity of the execution of the operation of the machine with respect to the baseline executions of the operation of the machine;

comparing the statistical primitive with an LMP threshold using a second sliding window method over the LMP values to determine an accumulation of the LMP values above the LMP threshold for a period of time governed by a length of a window in the second sliding window method; and detecting an anomaly when the accumulation of the LMP values above the LMP threshold for the period of time is greater than an anomaly detection threshold to produce a result of anomaly detection; and outputting the result of the anomaly detection.

* * * * *